US012794652B2

(12) United States Patent
Nemeth et al.

(10) Patent No.: US 12,794,652 B2
(45) Date of Patent: Nov. 10, 2026

(54) METHOD FOR HALF-DUPLEX MULTI-CARRIER UE CONFIGURATION AND BEHAVIOUR IN gNB-ONLY SBFD DEPLOYMENT

(71) Applicant: MediaTek Singapore Pte. Ltd., Singapore (SG)

(72) Inventors: Jozsef Gabor Nemeth, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 411 days.

(21) Appl. No.: 18/380,740

(22) Filed: Oct. 17, 2023

(65) Prior Publication Data

US 2024/0137191 A1 Apr. 25, 2024
US 2024/0235796 A9 Jul. 11, 2024

Related U.S. Application Data

(60) Provisional application No. 63/380,763, filed on Oct. 25, 2022.

(51) Int. Cl.
*H04L 5/00* (2006.01)
*H04L 5/16* (2006.01)

(52) U.S. Cl.
CPC .......... *H04L 5/0094* (2013.01); *H04L 5/0064* (2013.01); *H04L 5/16* (2013.01)

(58) Field of Classification Search
CPC ... H04L 5/0053; H04L 5/0058; H04L 5/0064; H04L 5/0091; H04L 5/0094; H04L 5/001; H04L 5/14; H04L 5/1469; H04L 5/16; H04W 72/0453; H04W 72/50; H04W 72/56; H04W 72/563
See application file for complete search history.

(56) References Cited

U.S. PATENT DOCUMENTS 12,500,728 B2 * 12/2025 Awadin ............ H04W 72/0453
2024/0056283 A1 * 2/2024 Abdelghaffar .......... H04L 5/001
(Continued)

OTHER PUBLICATIONS

TCL, "Discussion on subband non-overlapping full duplex", Oct. 10-Oct. 19, 2022, 3GPP TSG RAN WG1 # 110bis-e meeting, R1-2208403, pp. 1-9 (Year: 2022).*
(Continued)

*Primary Examiner* — Paul H. Masur
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. In certain configurations, the UE receives, from a base station, a plurality of time division duplexing (TDD) configurations of time slots and symbols for a plurality of component carriers (CCs). The CCs include
(Continued)

a first CC and a second CC. The UE determines, according to the TDD configurations, whether a collision exists between an uplink (UL) transmission on the first CC and a downlink (DL) reception on the second CC for each of the time slots and the symbols. The UE selects one of the UL transmission and the DL reception for one of more of the time slots and the symbols with the collision based on a plurality of priority rules.

18 Claims, 21 Drawing Sheets

(56) References Cited

U.S. PATENT DOCUMENTS

| | | | | |
|---|---|---|---|---|
| 2024/0064796 | A1* | 2/2024 | Abdelghaffar | H04L 5/0094 |
| 2024/0089960 | A1* | 3/2024 | Hao | H04W 72/566 |
| 2024/0097866 | A1* | 3/2024 | Nemeth | H04L 5/1469 |
| 2024/0098724 | A1* | 3/2024 | Shi | H04L 5/0094 |
| 2024/0107525 | A1* | 3/2024 | Khan Beigi | H04L 5/1469 |
| 2024/0121070 | A1* | 4/2024 | Abdelghaffar | H04W 48/12 |
| 2024/0372661 | A1* | 11/2024 | Park | H04L 5/0044 |
| 2025/0184107 | A1* | 6/2025 | Liu | H04L 5/14 |
| 2026/0059501 | A1* | 2/2026 | Zhang | H04W 72/0446 |

OTHER PUBLICATIONS

New H3C, "Discussion for subband non-overlapping full duplex", Oct. 10-19, 2022, 3GPP TSG RAN WG1 #110bis-e, R1-2208527, pp. 1-10 (Year: 2022).*

Spreadtrum, "Discussion on subband non-overlapping full duplex", Oct. 10-19, 2022, 3GPP TSG RAN WG1 #110bis-e, R1-2208552, pp. 1-15 (Year: 2022).*

Vivo, "Discussion on subband non-overlapping full duplex", Oct. 10-19, 2022, 3GPP TSG RAN WG1 #110bis-e, R1-2208641, pp. 1-12 (Year: 2022).*

Intel, "Discussions on subband non-overlapping full duplex", Oct. 10-19, 2022, 3GPP TSG RAN WG1 #110bis-e, R1-2209052, pp. 1-17 (Year: 2022).*

Sony, "Considerations on Subband Full Duplex TDD operations", Oct. 10-19, 2022, 3GPP TSG RAN WG1 #110bis-e, R1-2209099, pp. 1-13 (Year: 2022).*

Nokia, "On subband non-overlapping full duplex for NR", Oct. 10-19, 2022, 3GPP TSG RAN WG1 #110bis-e, R1-2210042, pp. 1-21 (Year: 2022).*

Wilus, "Discussion on subband non-overlapping full duplex", Oct. 10-19, 2022, 3GPP TSG RAN WG1 #110bis-e, R1-2210138, pp. 1-8 (Year: 2022).*

3GPP, "Physical layer procedures for control (Release 16)", 2022-09, 3GPP TS 38.213 V16.11.0, pp. 1-189 (Year: 2022).*

* cited by examiner

METHOD FOR HALF-DUPLEX MULTI-CARRIER UE CONFIGURATION AND BEHAVIOUR IN gNB-ONLY SBFD DEPLOYMENT

CROSS-REFERENCE TO RELATED APPLICATION(S)

This application claims the benefits of U.S. Provisional Application Ser. No. 63/380,763, entitled "METHOD FOR HALF-DUPLEX MULTI-CARRIER UE CONFIGURATION AND BEHAVIOUR IN GNB-ONLY SBFD DEPLOYMENT" and filed on Oct. 25, 2022, which is expressly incorporated by reference herein in their entirety.

BACKGROUND

Field

The present disclosure relates generally to communication systems, and more particularly, to techniques of methods and apparatuses for half-duplex multi-carrier user equipment (UE) configuration and behaviour in gNB-only Subband Full Duplex (SBFD) deployment.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5GNR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE receives, from a base station, a plurality of time division duplexing (TDD) configurations of time slots and symbols for a plurality of component carriers (CCs). The CCs include a first CC and a second CC. The UE determines, according to the TDD configurations, whether a collision exists between an uplink (UL) transmission on the first CC and a downlink (DL) reception on the second CC for each of the time slots and the symbols. The UE selects one of the UL transmission and the DL reception for one of more of the time slots and the symbols with the collision based on a plurality of priority rules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
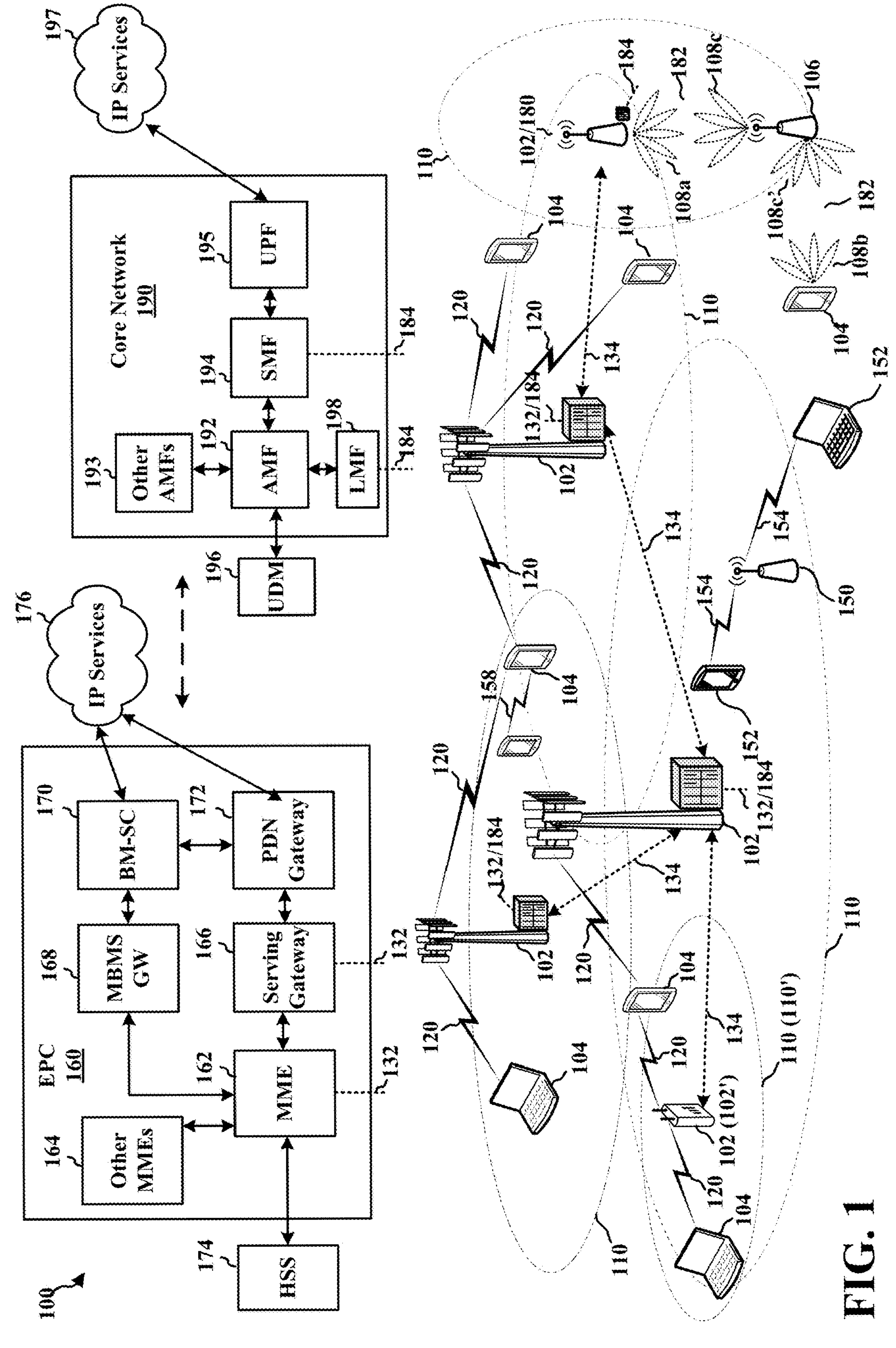
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
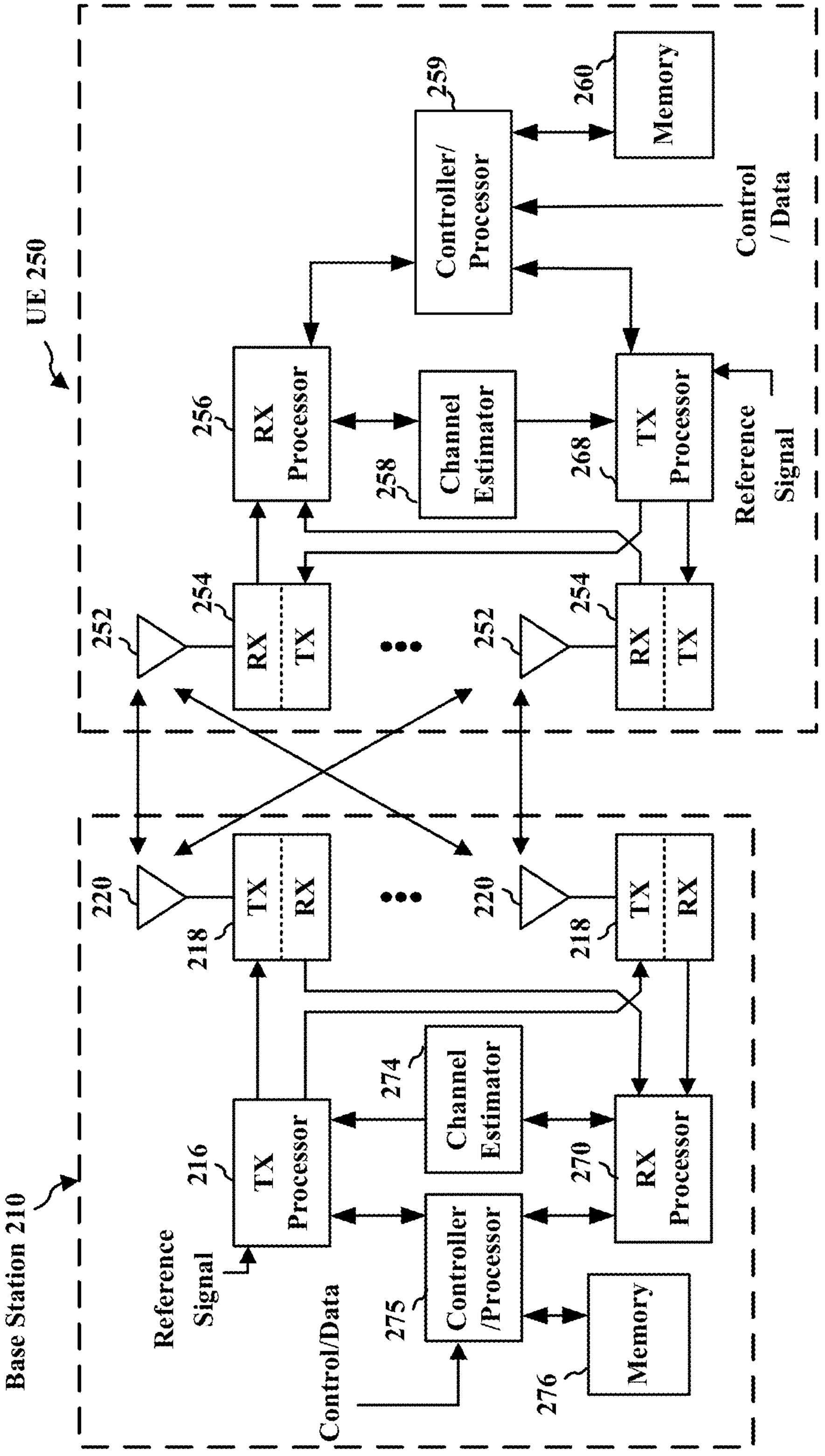
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
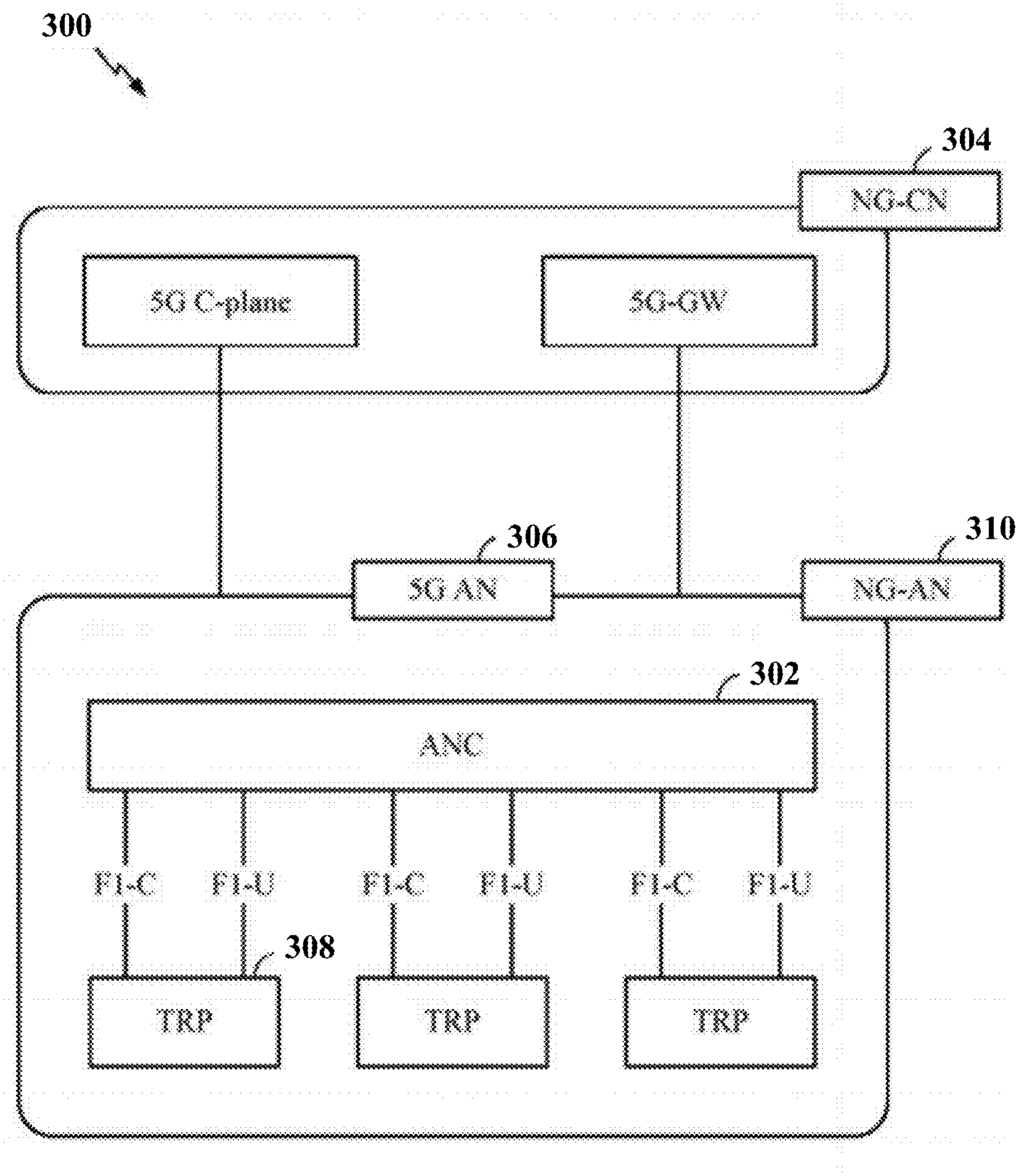
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
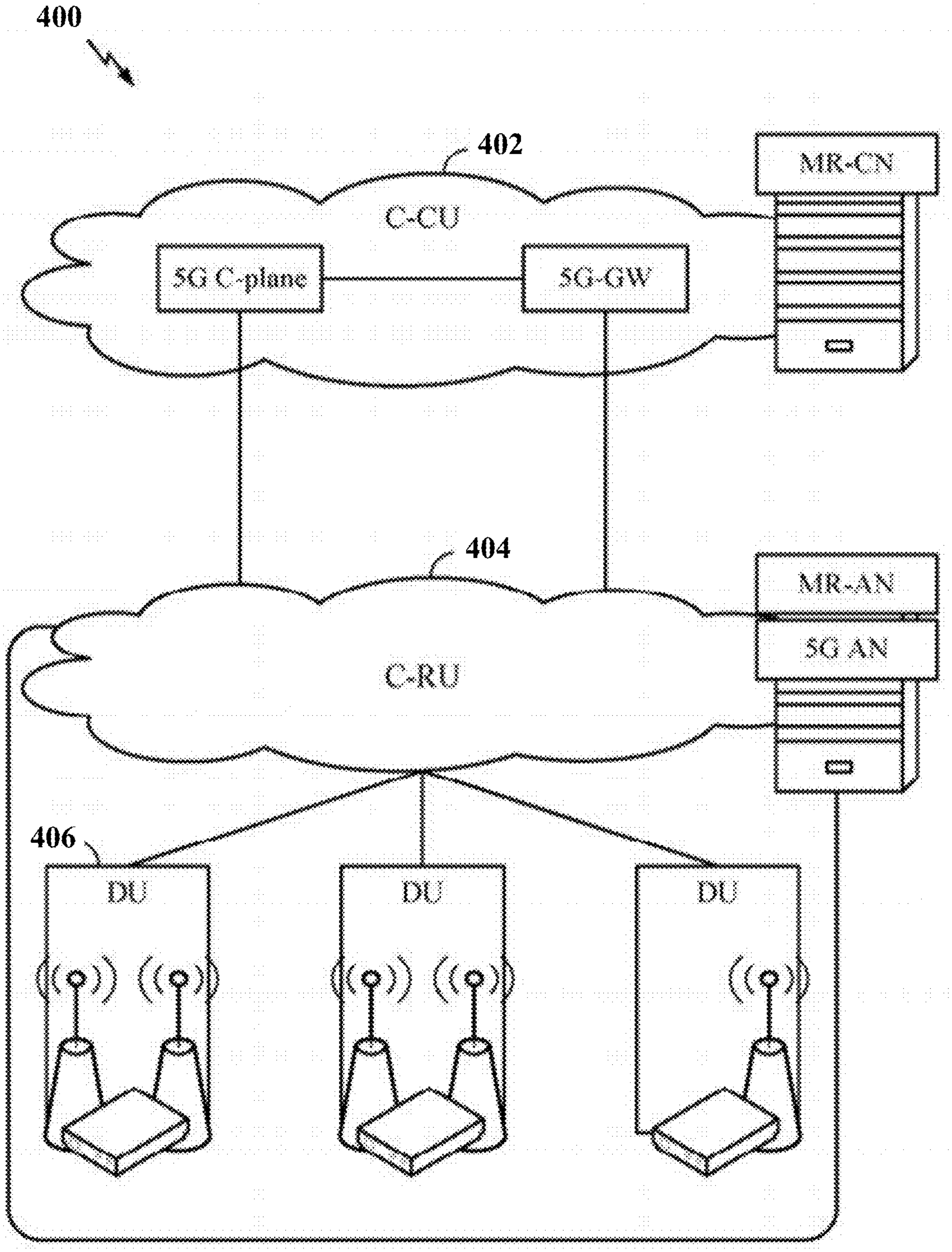
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
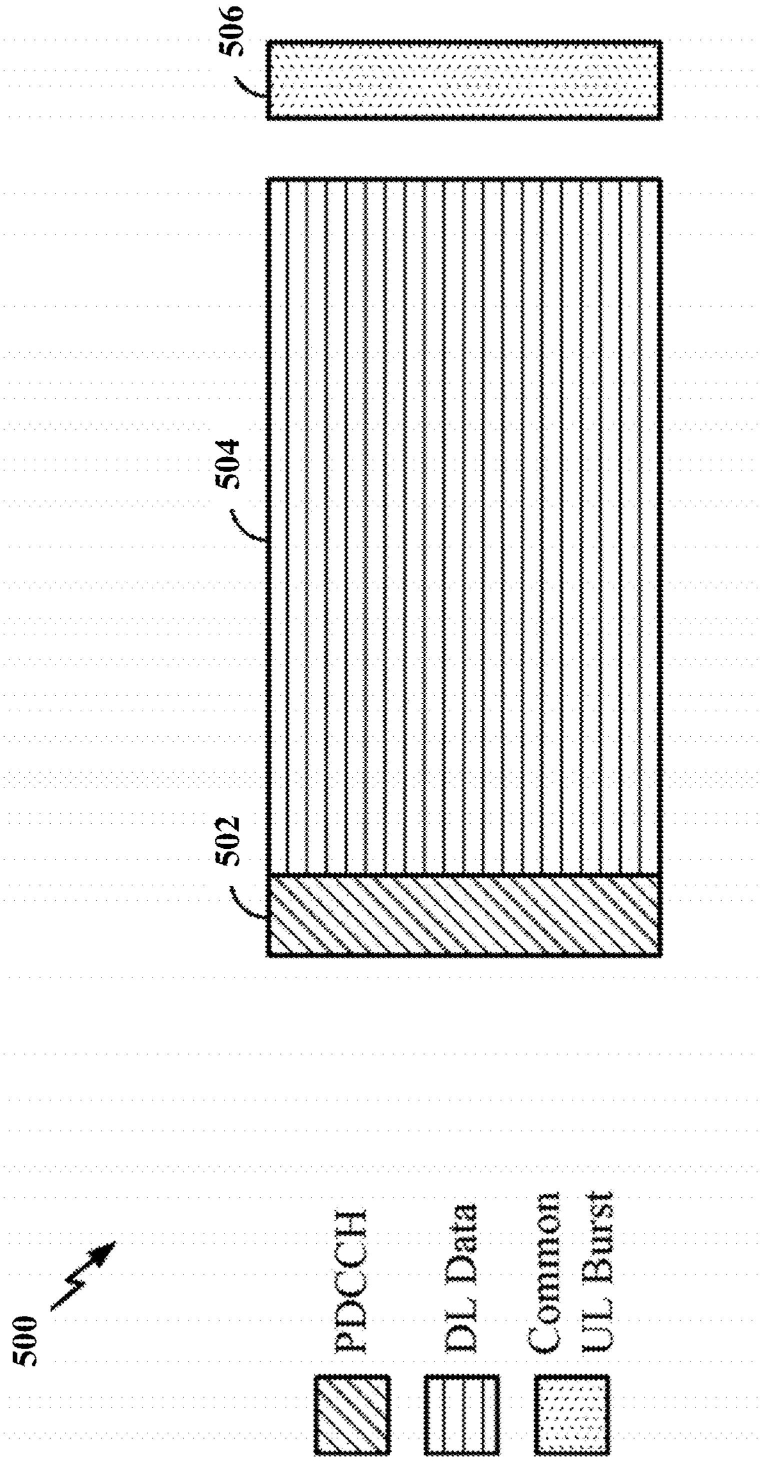
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
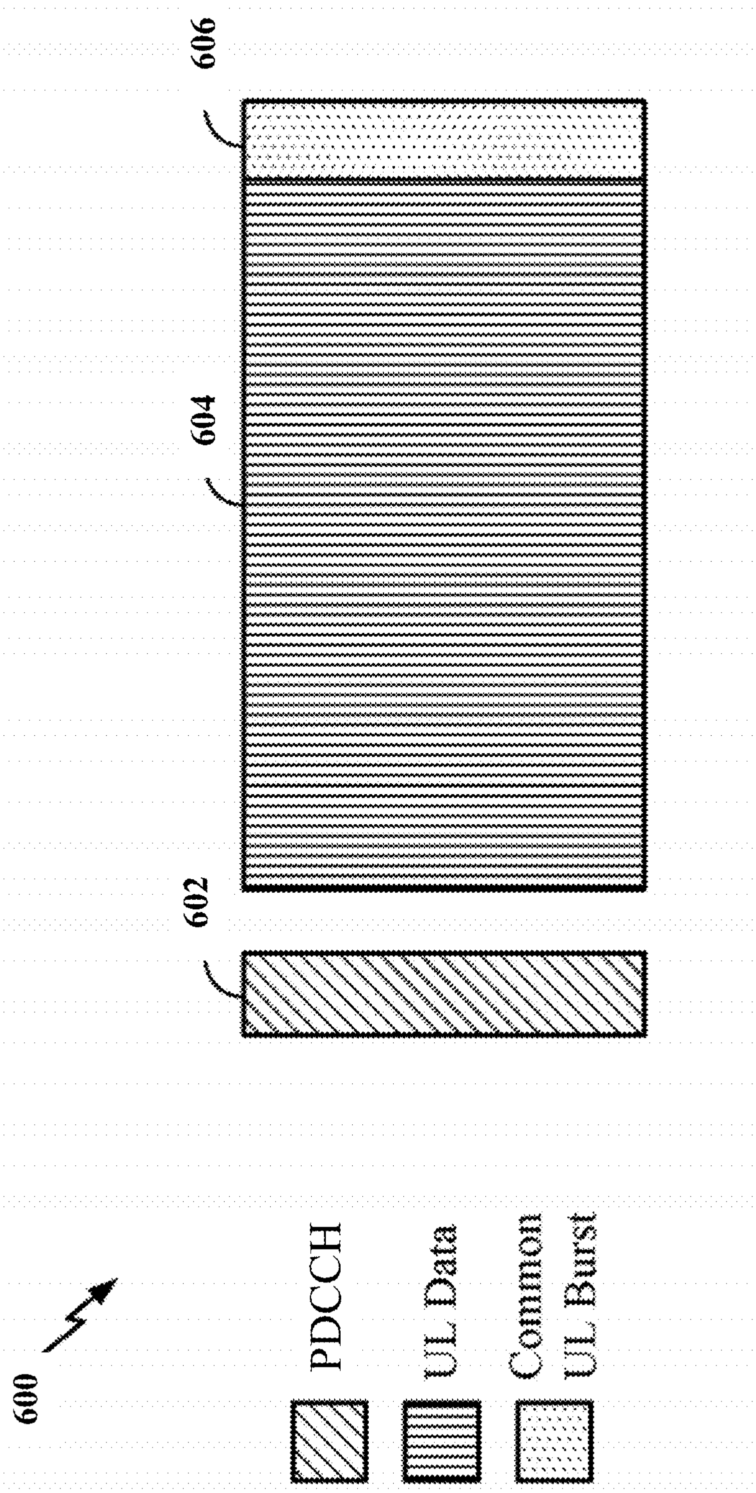
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

As discussed above, NR may utilize OFDM with a CP on the uplink and downlink and may include support for half-duplex operation using TDD. In certain configurations, carrier aggregation may apply such that multiple component carriers (CCs) may be assigned to a single user in the UE. The half-duplex UE may operate over multiple carriers which are split between uplink and downlink on certain symbols (i.e., CCs with opposite link directions: DL only or UL only) or slots. Such a deployment can offer gains in: (1) lower latency, since the UE can do half-duplex Frequency Division Duplex (FDD) by switching between carriers, sparing the alignment delay to UL-DL and DL-UL switching points of TDD; and (2) UL coverage extension in FR2 by enabling longer uplink transmit durations for repetitions. Thus, there are some issues to be solved as to: (1) how TDD frame format over multiple carriers may be configured to the UE so as to support SBFD with minimal standardization effort; (2) how dynamic scheduling decisions are supported as to the UE link direction or the SBFD layout itself; and (3) how intra-UE directional collisions are handled. In addressing these issues, it is desired that common configurations for the UE (broadcasted as part of SIB) need to be backward compatible with the legacy UEs.

In certain configurations, the UE may be configured to have UL/DL allocation between time slots, and the UL/DL allocation requires a split of the UE resources between the two directions. Specifically, there are multiple different signaling mechanisms that provide information to the UE on whether the resources are used for the UL transmission or DL reception. One of the mechanisms is semi-static signaling through RRC, where the network (i.e., base station) may send configuration information to the UE by RRC signaling, such that the UE is configured with the information related to a certain UL/DL allocation (e.g., a certain set of OFDM symbols is assigned to DL UL transmissions). In certain configurations, the RRC-signaled pattern is expressed as a concatenation of up to two sequences of DL-flexible-UL, together spanning a configurable period. Further, the UE may be configured with 2 patterns, e.g., one cell-specific provided as part of system information and one dedicated signaled in a device-specific manner. The resulting pattern is obtained by combining these two where the dedicated pattern can further restrict the flexible symbols signaled in the cell-specific pattern to be either DL or UL.

Another signaling mechanism is dynamic slot-format indication, where the base station dynamically signals the UL/DL allocation to the UE using a slot-format indicator (SFI), in which the slot format may indicate the number of OFDM symbols that are DL, flexible or UL. In certain configurations, the SFI message is in the form of a RRC-configured SFI table, where each row in the table is constructed from a set of predefined DL/flexible/UL patterns with one slot duration. Upon receiving the SFI, the UE may use the value as an index in the SFI table to obtain the UL/DL allocation pattern for one or more slots.

Figure 7:
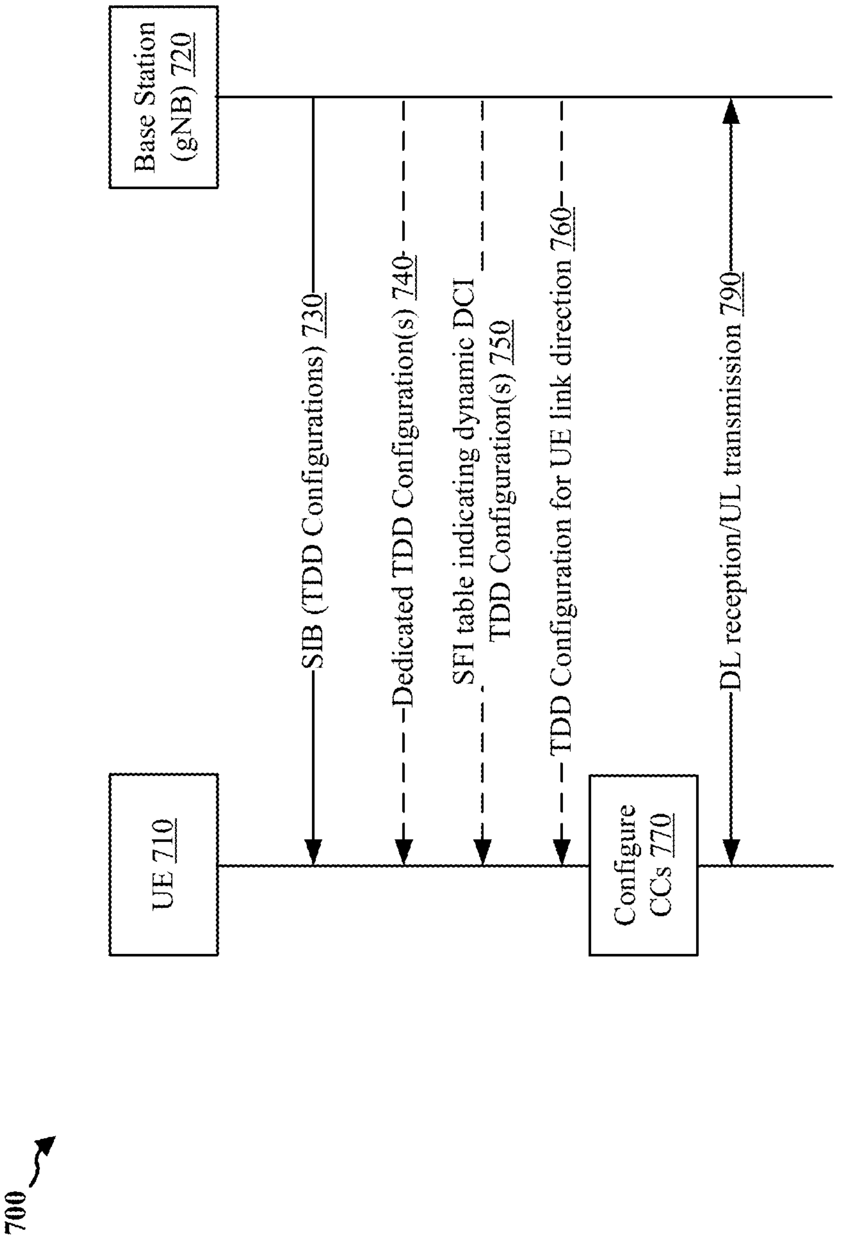
FIG. 7 is a diagram illustrating example procedure between a UE and a base station.

FIG. 7 is a diagram illustrating an example transmission procedure between a UE and a base station. Specifically, the UE 710 as shown in FIG. 7 is a half-duplex UE. At operation 730, the UE 710 receives a SIB broadcasted by the base station 720. Specifically, the SIB includes a TDD configuration (e.g., TDD-UL-DL-ConfigCommon) of symbols related to the time slots for each of a plurality of CCs in the UE 710. In certain configurations, the base station 720 broadcasts the SIB to all UEs, including the UE 710 and other UEs, available in the system.

Optionally, at operation 740, the base station 720 may further send one or more TDD configurations (e.g., TDD-UL-DLConfigDedicated) to the UE 710 by RRC signaling. Specifically, each TDD configuration at the operation 740 may be a cell-specific or dedicated semi-static TDD configuration. Optionally, at operation 750, the base station 720 may further send one or more TDD configurations indicated dynamically using SFI, i.e., the RRC configured SFI table and a group common downlink control information (DCI) pointing into the SFI table. Each TDD configuration at the operations 740 and 750 corresponds to one of the CCs in the UE 710, and may also include symbols related to the time slots. Further, it should be noted that, although FIG. 7 shows that the UE 710 receives all of the TDD configurations at the operations 730, 740 and 750, it is possible that the UE 710 may receive only one or more of the TDD configurations for each CC at the operations 730, 740 and 750.

Then, optionally, at operation 760, the base station 720 may send a separate TDD configuration for UE link direction to the UE 710 in order to indicate to the UE the direction(s) to be selected in the CCs. This TDD configuration is dedicated to the UE 720 and may also be signaled through dynamic SFI indication. In certain configurations, the UE 710 may receive the TDD configuration for UE link direction in the first time slot of the TDD configurations received at the operations 730, 740 and 750, and in this case, the symbol of the first time slot of the TDD configurations will be a DL reception.

Upon receiving the TDD configurations, at operation 770, the UE 710 may configure the CCs based on the TDD configurations received. Specifically, the UE 710 may allocate, for each time slot after the first time slot, UL transmission and/or DL reception according to the TDD configuration for UE link direction received at the operation 760. The allocation according to the TDD configuration for UE link direction species the carrier (i.e., one of the CCs) and the physical resources used in the active bandwidth part of the carrier. At operation 790, the UE 710 may perform DL reception and/or UL transmission with the base station 720 based on the configuration.

Figure 8:
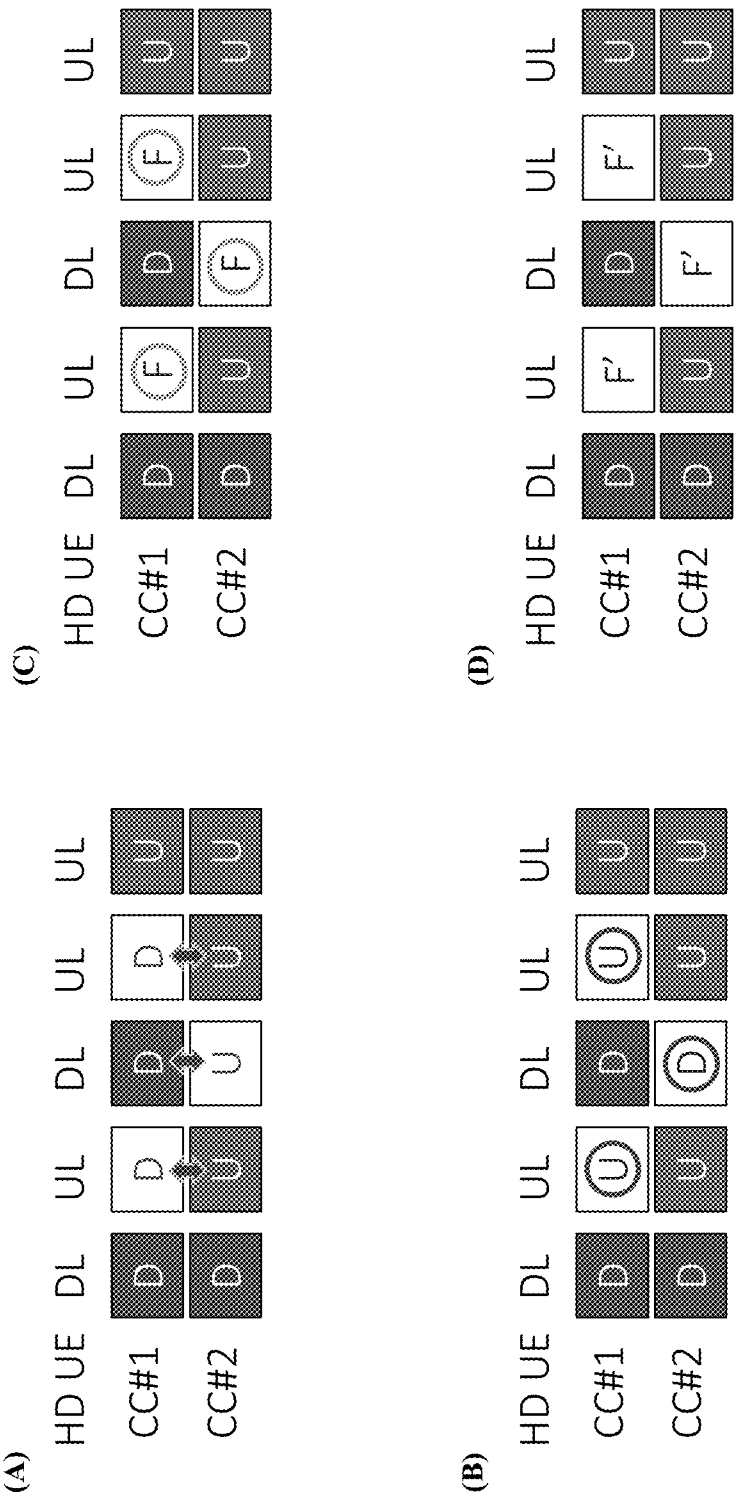
FIG. 8 is a diagram illustrating examples of slot symbols of a half-duplex UE TDD configuration in a SBFD network.

FIG. 8 is a diagram illustrating examples of slot symbols of a half-duplex UE TDD configuration in a SBFD network. Specifically, for simplicity, the examples in FIG. 8 illustrate only the slot level configuration and without special slots. As shown in FIG. 8, the half-duplex UE (e.g., the UE 710) may be configured with a first CC (CC #1) and a second CC (e.g., CC #2). The first CC and the second CC may have different TDD patterns for UL/flexible/DL slots, and the symbols as shown in FIG. 8 use "U" as an UL symbol, "F" as a flexible symbol and "D" as a DL symbol.

As shown in FIG. 8(A), the UE may be configured according to the TDD configurations with a duplexing layout. Specifically, for the first CC, the TDD patterns of the time slots are configured as D-D-D-D-U, and for the second CC, the TDD patterns of the time slots are configured as D-U-U-U-U. Therefore, in the three middle time slots, there is a UL-DL collision between the two CCs within the same frequency band. By the current standard, the collision leads to an error case. Further, there is a lack of prioritization between the two CCs and no indication as to which link direction the half-duplex UE should favor, making scheduling inflexible.

In contrast, as shown in FIG. 8(B), the UE may be configured to indicate the UE link direction (e.g., the direction of transmissions intended by the UE in the TDD configuration for UE link direction received at operation 760) in both CCs, in which the symbols in the unused subband are circled to show the different symbols from the TDD patterns as shown in FIG. 8(A). As shown in FIG. 8(B), the TDD patterns of the time slots for both CCs are configured as D-U-D-D-U, which indicates the intended UE link direction. In this case, there is no need for prioritization between the CCs of the UE, since the UE link direction is configured to both CCs as opposed to the network link direction. However, this configuration is not ideal, as the UL-DL prioritization within a CC (e.g., the first CC) is configured incorrectly for the unused subband in partitioned symbols, potentially leading to inter-UE UL-DL collision.

On the other hand, as shown in FIG. 8(C), the UE may choose to be configured to indicate the UE link direction on available subband and "semi-static flexible" otherwise, in which the symbols in the unused subband (now "F" to indicate the semi-static flexible symbols) are circled to show the different symbols from the TDD patterns as shown in FIG. 8(A). In this case, the issue of lack of prioritization between the two CCs still exists, and the UL-DL prioritization within a CC is not provided for the unused subband in partitioned symbols, making scheduling inflexible.

Moreover, as shown in FIG. 8(D), the UE may choose to be configured to indicate the UE link direction on available subband and "dynamic flexible" otherwise, in which the symbols in the unused subband are shown as "F'" to indicate the dynamic flexible symbols. Compared to the cases as shown in FIGS. 8(A) and (C), there is no need for prioritization between the CCs, since the UE link direction is clearly indicated by configuration. Further, the UL-DL prioritization within a CC is configured correctly, and the unused subband F' (i.e., the symbol indicated as being dynamic flexible via the SFI table) will deprioritize any transmission or reception that is not scheduled by DCI. However, there is a lack of prioritization mechanism between the CCs for dynamic scheduling (e.g., DCI schedules Tx/Rx over F' symbol while the other CC has semi-static Rx/Tx, response). Moreover, it is inefficient to always handle deprioritization between semi-static Tx/Rx solely by GC SFI signaling.

Therefore, there is a need of rules to deduce network SBFD layout for enhanced UE behaviours, such as transmitter power control (TPC), channel state information (CSI), repetitions, etc.

In certain configurations, the UE may be configured to allow collisions in the TDD configurations between the CCs. For example, in the TDD configurations indicated to the UE reflect the full-duplex layout applied by the gNB (i.e., base station) as shown in FIG. 8(A), there is a collision in the second and fourth time slots where (CC #1, CC #2)=(DL, UL) or the third time slot where (CC #1, CC #2)=(UL, DL). Thus, the UE may be configured to allow such collision between the UL transmission on one CC and DL reception on another CC in the same frequency band. For example, in certain configurations, the UE may reuse TDD PRACH mapping/validation rules per each CC. Further, as discussed above, in the case as shown in FIG. 8(A) (and throughout the examples as shown in FIG. 8), there is a lack of prioritization mechanism between the CCs. Accordingly, the UE may introduce a plurality of prioritization rules to prioritize one of the UL transmission and the DL reception in each time slot that causes a collision, a second CC, including scenarios involving semi-static configurations only. Optionally, the UE may add configuration IE to indicate selected UE link direction instead of relying on priority handling.

Similarly, in the case as shown in FIG. 8(D), where the dynamic flexible symbols are used for scenarios involving Tx/Rx scheduled by DCI on the F' symbol, the UE may adopt the priority rules. For example, in certain configurations, when the case as shown in FIG. 8(A) is not supported (e.g., the UE is not configured to allow the collision), the UE may add rules which deduce the network link direction where F' is indicated, thus distinguishing between partitioned and non-partitioned slots for UL TPC, CSI measurement report, etc. Further, the UE may introduce semi-static configuration based on the SFI table to improve efficiency over monitoring of dynamic SFI signaling. Optionally, the UE may adjust PRACH mapping/validation rules.

It should be noted that, although FIG. 8 shows the symbols in blocks that align with each other in each of the time slots, the actual DL reception and UL transmission may require different expected periods of time, such that the symbols may not perfectly align with each other over time. Thus, collision may occur between any given UL transmission and DL reception that has a time overlap, or in the case where the requirements for a Tx-Rx or Rx-Tx turn around time cannot be met between the UL transmission and DL reception.

Further, even if the UE is configured to allow the collision and/or to introduce the prioritization rules, there may be an issue related to the carrier aggregation scheduling overheads (DCI, GB) in DL-only, UL-only symbols. In this case, the UE may be configured to switch to yet another CC (e.g., a CC #3) spanning the network bandwidth in these symbols. However, this would involve switching overhead and issues with repetitions across such switching points between partitioned and non-partitioned slots/symbols.

As discussed above, according to the current specifications, there is an error case if UL transmission and DL reception collide on the symbols in a time slot between two CCs in the same frequency band. However, an exception exists in that the UE allows collision with SSB and prioritize SSB reception if (1) a higher layer parameter directionalCollisionHandling-r16 is configured to be enabled for all cells involved in the collision, (2) the UE indicates support of half-DuplexTDD-CA-SameSCS-r16 capability, and (3) the UE is not configured to monitor PDCCH for detection of DCI format 2_0 on any of the multiple serving cells.

Thus, the UE may indicate support of priority handling of collision between the UL transmission on one CC and DL reception over another CC in the same frequency. In one embodiment, the network signals if the UE supporting the above prioritization should expect collision to happen. In one embodiment, directionalCollisionHandling-r16 is supported/enabled on the involved CCs to enable directional collision handling for the serving cells. In one embodiment, numerologies may be the same over the two CCs for priority handling and half-DuplexTDD-CA-SameSCS-r16 is supported by the UE, thus indicating support of half-duplex operation in TDD carrier aggregation with same subcarrier spacing (SCS).

Figure 9:
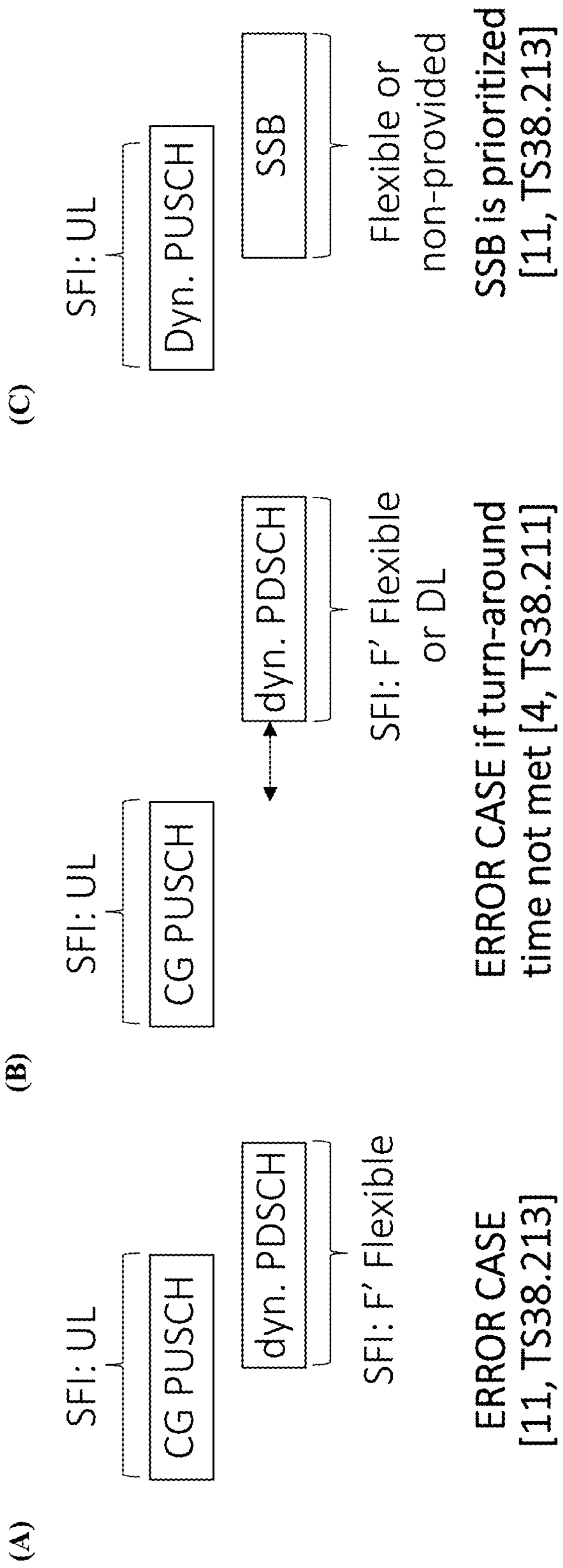
FIG. 9 is a diagram illustrating examples of collisions between an UL transmission and a DL reception.

FIG. 9 is a diagram illustrating examples of collisions between an UL transmission and a DL reception. Specifically, as discussed, collision between the UL transmission and the DL reception occurs when there is a time overlap on any symbol, or, in certain configurations, when the requirement of a transmission-reception or reception-transmission turn around time between the UL transmission and the DL reception is not met. As shown in FIG. 9(A), collision occurs when a CG PUSCH, which is a dynamic UL transmission indicated by SFI, has a time overlap with the dynamic PDSCH, which is a dynamic DL in a dynamic flexible (F') symbol indicated by the SFI. It should be noted that the time overlap between the CG PUSCH (dynamic UL transmission) and the dynamic PDSCH (dynamic DL reception) does not have to be a complete overlap for each of the DL reception and/or the UL transmission. As shown in FIG. 9(B), collision also occurs when the requirement of the transmission-reception turn around time is not met between the CG PUSCH and the dynamic PDSCH. According to the current specification, both cases as shown in FIGS. 9(A) and (B) would result in error cases. On the other hand, the UE may introduce a plurality of prioritization rules to support the priority handling in order to determine the priority between the DL reception and the UL transmission. In this case the UE may proceed with the prioritized DL/UL transmission, and the deprioritized Tx/Rx may be cancelled as in current standard [11, TS 38.213]. For example, SRS on non-overlapping symbols is transmitted, and the UE processing timeline for Tx cancellation is expected, allowing partial cancellation capability.

Further, according to current specification, it is an error case if a given symbol is indicated as downlink on one CC and uplink on another CC within the same frequency band. Work-arounds using the flexible symbols on one of the CC either signaled semi-statically or dynamically limit the configuration flexibility of semi-static resources. In certain configurations, it is allowed by specification that the TDD configurations indicate opposite link directions (i.e. uplink vs. downlink) on any two CCs within the same frequency band. In certain configurations, the same validation rules of PRACH occasions, MsgA PUSCH (Preamble-to-PRU) occasions and RO/Preamble-to-PRU mapping rules for TDD can be used for intra-band CA gNB-only SBFD.

In certain configurations, the UE may introduce the prioritization rules in order to prioritize one of the UL transmission on the first CC and the DL reception on the second CC that causes a collision in a time slot. Examples of the prioritization rules will be introduced in details as follows. Specifically, the UL transmission and/or DL reception may be a dedicated or cell-specific semi-static UL/DL transmission, or a dynamic UL/DL transmission. In certain configurations, examples of the dynamic DL reception may include: DCI scheduling PDSCH (including SIB), or A-CSI-RS; examples of the dynamic UL transmission may include: DCI/RAR scheduling PUSCH, PUCCH:HARQ (including Msg4/MsgB HARQ), A-CSI, A-SRS, and Ordered-PRACH triggered by DCI; examples of dedicated semi-static DL reception may include: PDCCH in USS, SPS PDSCH, P/SP-CSI-RS, PRS (without a measuring gap); examples of dedicated semi-static UL transmission may include: CG-PUSCH, PUCCH:P/SP-CSI, SR, HARQ; examples of cell-specific semi-static DL reception may include: SSB or PDCCH in Type0/0A/1/2 CSS; and examples of cell-specific semi-static UL transmission may include: valid PRACH occasion, and MsgA PUSCH.

As discussed above, the introduction of the prioritization rules may solve the issue of lack of intra-band carrier aggregation prioritization of dynamic scheduling between CCs of a half-duplex UE within same band. For example, in the scenario where the DCI schedules Tx/Rx over a F' symbol collides with semi-static Rx/Tx, response on the other CC, such as the case as shown in FIG. 9(A), or in the scenario where back-to-back scheduling leaves no time for Rx-Tx turn-around, e.g., the case as shown in FIG. 9(B), the prioritization rules may solve the collision issues.

Further, it should be noted that the SSB arbitration must take into account that it is essential for synchronization. For example, in the case where PUSCH/PUCCH scheduled by DCI collides with SSB, the SSB may be prioritized. FIG. 9(C) shows a collision between the dynamic PUSCH (i.e., a dynamic UL transmission indicated by SFI) and the SSB (i.e., a cell-specific semi-static DL reception which may be flexible or non-provided). As a consequence, SSB is usually prioritized over the dynamic PUSCH or other UL transmissions, except when the prioritization is left to the UE implementation, as in the collision case with valid PRACH occasion.

Figure 10:
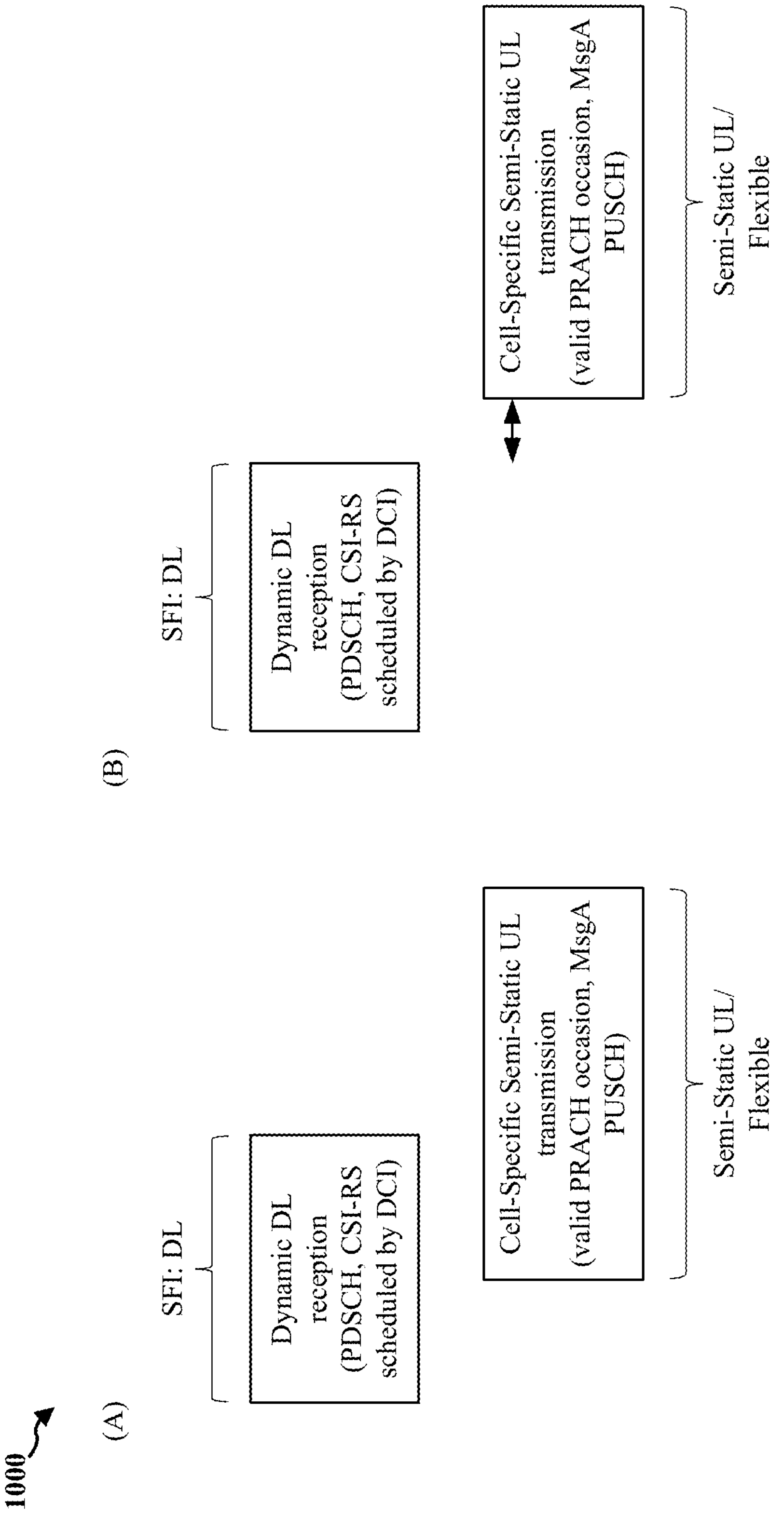
FIG. 10 is a diagram illustrating the priority rule related to a cell-specific semi-static UL transmission and a dynamic DL reception.

FIG. 10 is a diagram illustrating the priority rule related to a cell-specific semi-static UL transmission and a dynamic DL reception. Specifically, in the priority rule 1000, when a dynamic DL reception, e.g., a PDSCH or CSI-RS scheduled by the DCI, collides with a cell-specific semi-static UL transmission, such as a valid PRACH occasion (including any guard intervals that precedes it according to the specification) or a MsgA PUSCH on any symbol (e.g., semi-static UL or flexible), as shown in FIG. 10(A), or if Tx-Rx or Rx-Tx turn around time between the UL/DL transmissions cannot be met, as shown in FIG. 10(B), then it is up to UE implementation whether the UE prioritize the PRACH transmission or the downlink reception. However, when the dynamic DL reception is a PDSCH reception with repetitions and the UE implementation rule indicates prioritizing the UL transmission (i.e., the PDSCH repetitions is deprioritized), the UE may allow the PDSCH repetitions to continue in the time slot.

Figure 11:
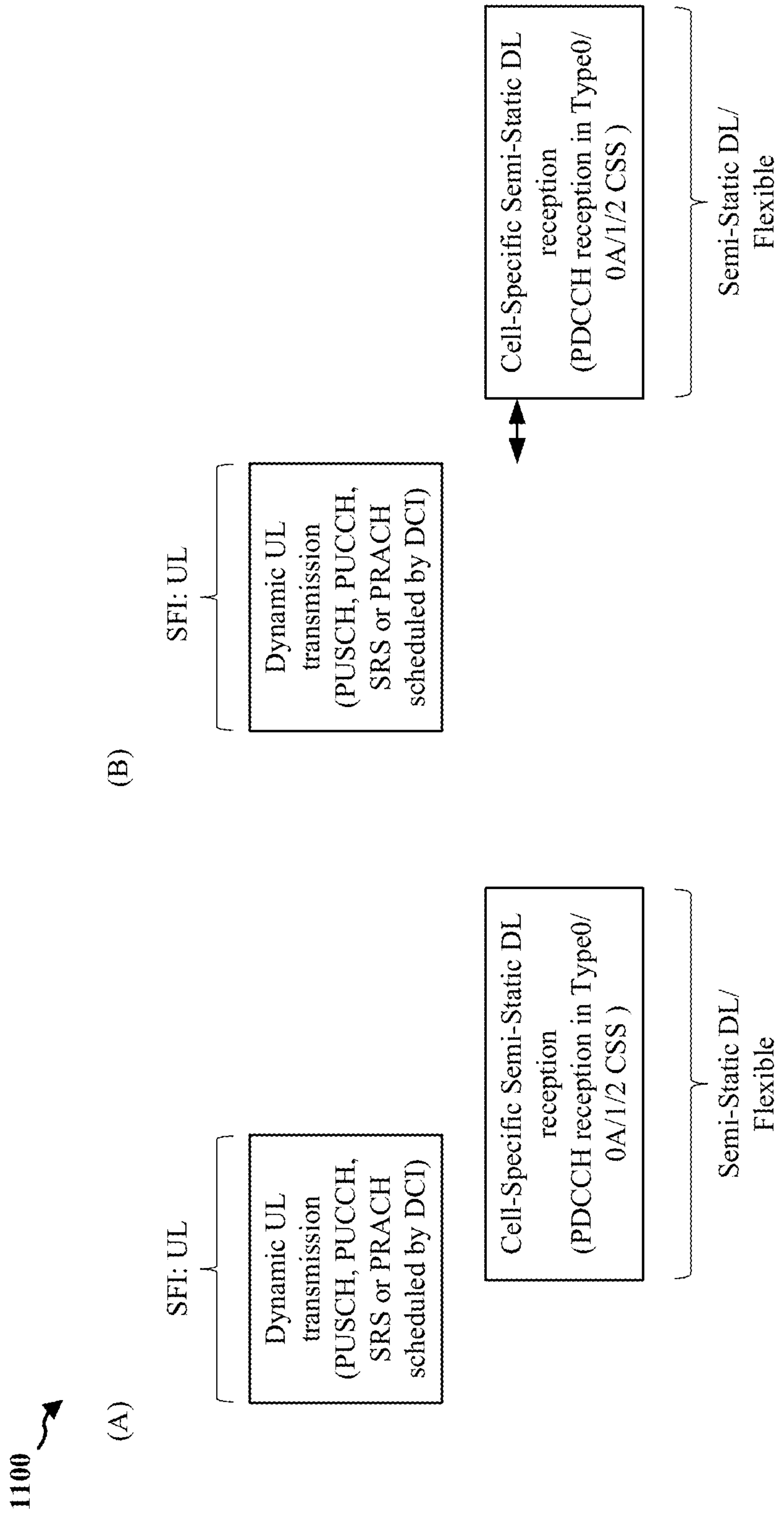
FIG. 11 is a diagram illustrating the priority rule related to a dynamic UL transmission and a cell-specific semi-static DL reception.

FIG. 11 is a diagram illustrating the priority rule related to a dynamic UL transmission and a cell-specific semi-static DL reception. Specifically, in the priority rule 1100, when a dynamic UL transmission, such as PUSCH, PUCCH, SRS or PRACH scheduled by DCI, collides with a cell-specific semi-static DL reception, such as a PDCCH reception in Type0/0A/1/2 CSS on any symbol (e.g., semi-static DL or flexible), as shown in FIG. 11(A), or if the Tx-Rx or Rx-Tx turn around time between the dynamic UL transmission and the cell-specific semi-static DL reception cannot be met, as shown in FIG. 11(B), the UE may prioritize the dynamic UL transmission scheduled by DCI.

Figure 12:
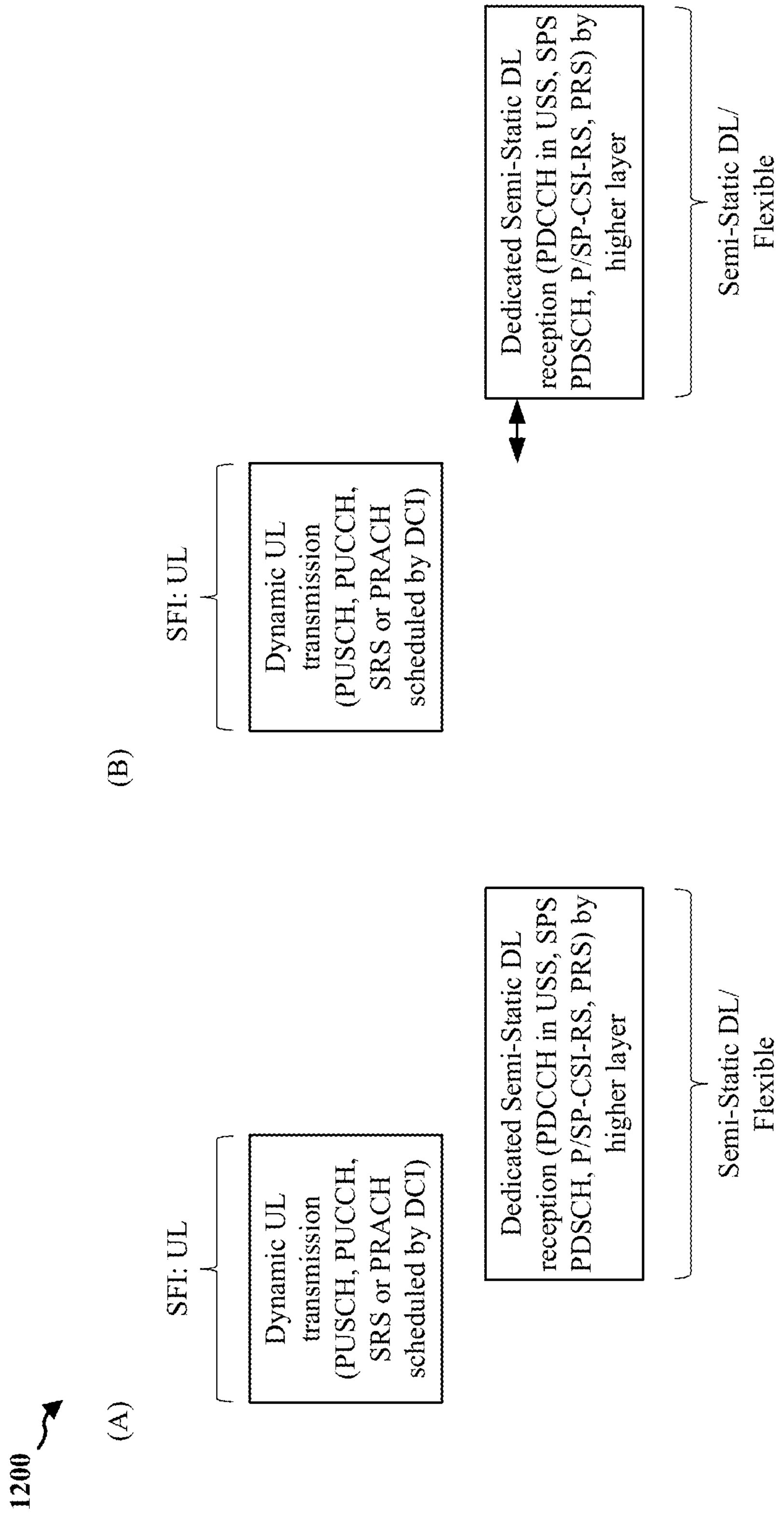
FIG. 12 is a diagram illustrating the priority rule related to a dynamic DL reception and a dedicated semi-static UL transmission.
Figure 13:
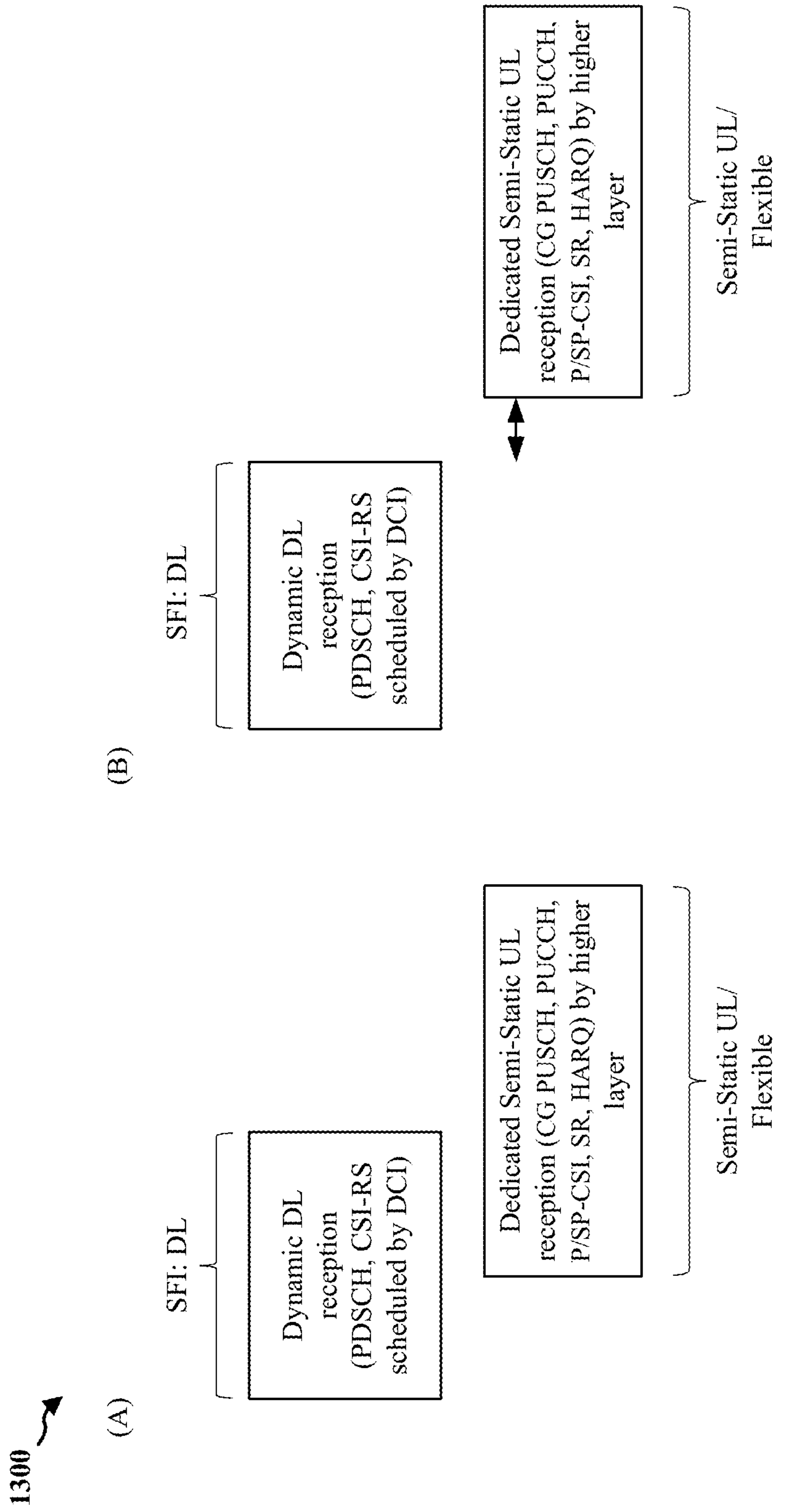
FIG. 13 is a diagram illustrating the priority rule related to a dedicated semi-static DL reception and a dynamic UL transmission.

FIG. 12 is a diagram illustrating the priority rule related to a dynamic DL reception and a dedicated semi-static UL transmission, and FIG. 13 is a diagram illustrating the priority rule related to a dedicated semi-static DL reception and a dynamic UL transmission. Specifically, in the priority rules 1200 and 1300, when a dynamic UL transmission (e.g., DCI/RAR scheduling PUSCH, PUCCH:HARQ (including Msg4/MsgB HARQ), A-CSI, A-SRS, Ordered-PRACH triggered by DCI) collides with a dedicated semi-static DL reception (e.g., PDCCH in USS, SPS PDSCH, P/SP-CSI-RS, PRS) configured by higher layer on any symbol (semi-static DL or flexible), as shown in FIG. 12(A), or when a dynamic DL reception (e.g., DCI scheduling PDSCH, A-CSI-RS) scheduled by DCI collides with a dedicated semi-static UL transmission (e.g., CG PUSCH, PUCCH, P/SP-CSI, SR, HARQ) configured by higher layer on any symbol (semi-static UL or flexible), as shown in FIG. 13(A), or if Tx-Rx or Rx-Tx turn around time cannot be met between them, as shown in FIG. 13(B) and FIG. 14(B), the UE may prioritize the dynamic UL transmission or the dynamic DL reception scheduled by DCI over the dedicated semi-static DL reception or the dedicated semi-static UL transmission, respectively.

Figure 14:
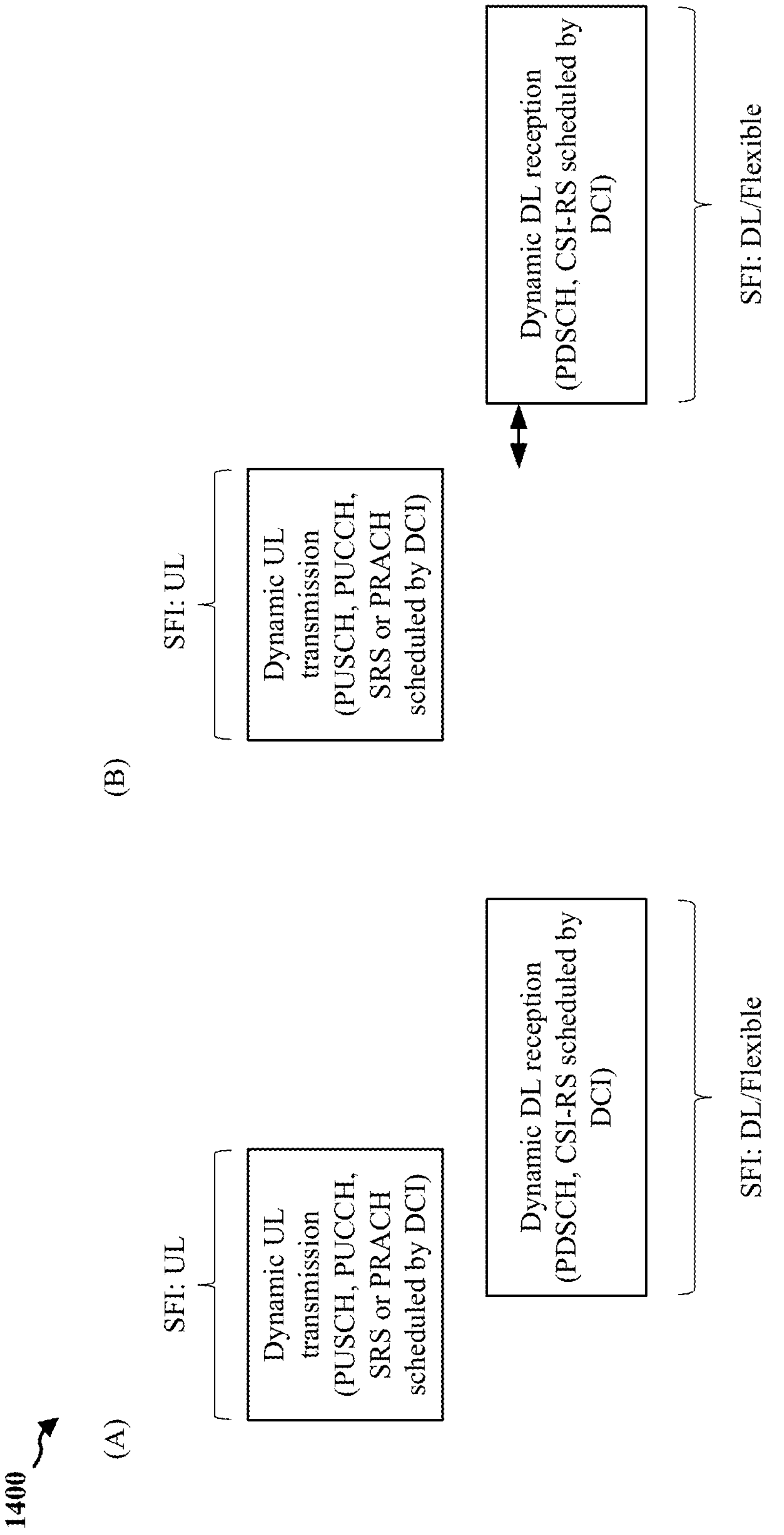
FIG. 14 is a diagram illustrating the priority rule related to a dynamic UL transmission and a dynamic DL reception.

FIG. 14 is a diagram illustrating the priority rule related to a dynamic UL transmission and a dynamic DL reception. Specifically, in the priority rule 1400, when a dynamic UL transmission, such as the PUSCH, PUCCH transmission scheduled by DCI, collides with a dynamic DL reception, such as a PDSCH transmission scheduled by DCI on any symbol (DL or flexible), as shown in FIG. 14(A), or if Tx-Rx or Rx-Tx turn around time between the dynamic UL/DL transmissions cannot be met, as shown in FIG. 14(B), the UE may determine the prioritization based on the priority of the dynamic UL/DL transmissions. For example, one of the dynamic UL transmission and a dynamic DL reception may be assigned with a high priority, and the other has a low priority. In this case, the UE may prioritize the dynamic UL transmission/DL reception with the higher priority. On the other hand, if both the dynamic UL transmission/DL reception are assigned with the same priorities, the UE may determine that an error case has occurred.

It should be noted that, in certain configurations, if traffic priority is not used in the prioritization, the priority rule 1400 may be dropped, and the priority rules 1000, 1100, 1200 and 1300 may be restricted to the collision cases where there is a time overlap, e.g., cases as shown in FIGS. 10(A), 11(A), 11(A) and 13(A), and the turn around time collision cases, e.g., cases as shown in FIGS. 11(B), 12(B), 13(B) and 14(B), are excluded. This is due to the rationale that, if latency is not an issue, prioritization can be achieved by the time overlap cases more economically.

Figure 15:
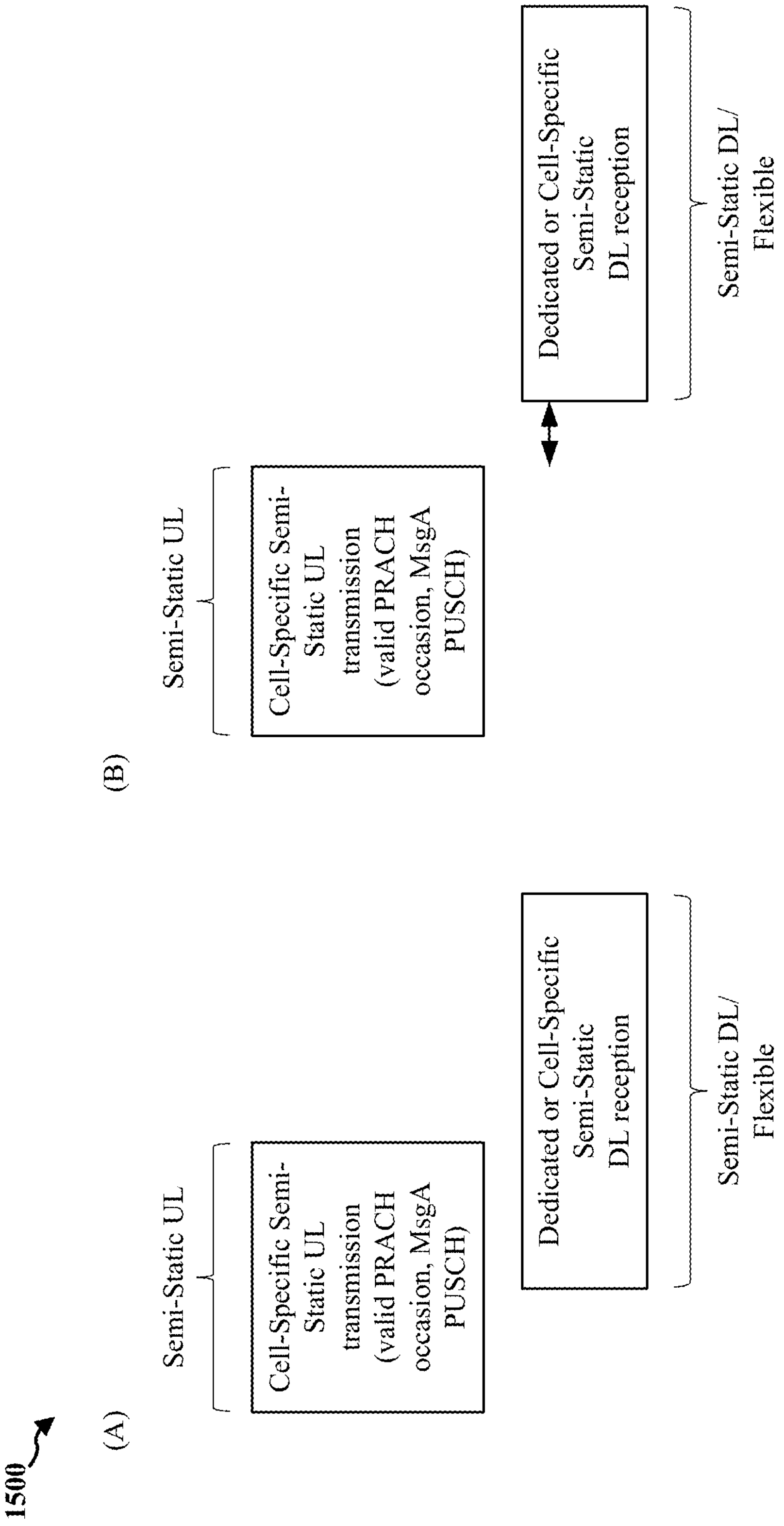
FIG. 15 is a diagram illustrating the priority rule related to a cell-specific semi-static UL transmission and a dedicated or cell-specific semi-static DL reception.

FIG. 15 is a diagram illustrating the priority rule related to a cell-specific semi-static UL transmission and a dedicated or cell-specific semi-static DL reception. Specifically, in the priority rule 1500, when a cell-specific semi-static UL transmission, such as a valid PRACH occasion (including any guard intervals that precedes it according to the specification) or a MsgA PUSCH, collides with a dedicated or cell specific semi-static DL reception (including SSB) scheduled by semi-static configuration on any symbol, as shown in FIG. 15(A), then it is up to UE implementation whether the UE prioritize the cell-specific semi-static UL transmission (e.g., PRACH or MsgA PUSCH) or the dedicated or cell-specific semi-static DL reception. Specifically, if the UE wants to transmit PRACH in a contention-based operation mode, the PRACH should have a higher priority than any other DL reception except for SSB reception, which may possibly be indispensable for synchronization. However, prioritizing all valid PRACH occasions would be inefficient when the UE does not have a need to send PRACH. Therefore, prioritization between the valid PRACH occasion and the dedicated or cell-specific DL reception should be up to the UE implementation concern and exclude the case of order PRACH triggered by DCI, which is a dynamic scheduling case. In this case, the base station (i.e., gNB) does not need to know which action the UE takes, as the base station will try to decode the valid PRACH occasion concurrently with the downlink transmission to the UE (or to any other UE). That is, the UL/DL concurrency is a given for the gNB.

In one embodiment, when the priority rule 1500 is applied, the collision is detected and prioritization is carried out according to the same rule (i.e. prioritize one or the other according to UE implementation) if scheduling does not leave sufficient headroom for the Tx-Rx or Rx-Tx turn around of the UE in addition to any other gap that is necessary according to current standard, as shown in FIG. 15(B).

Figure 16:
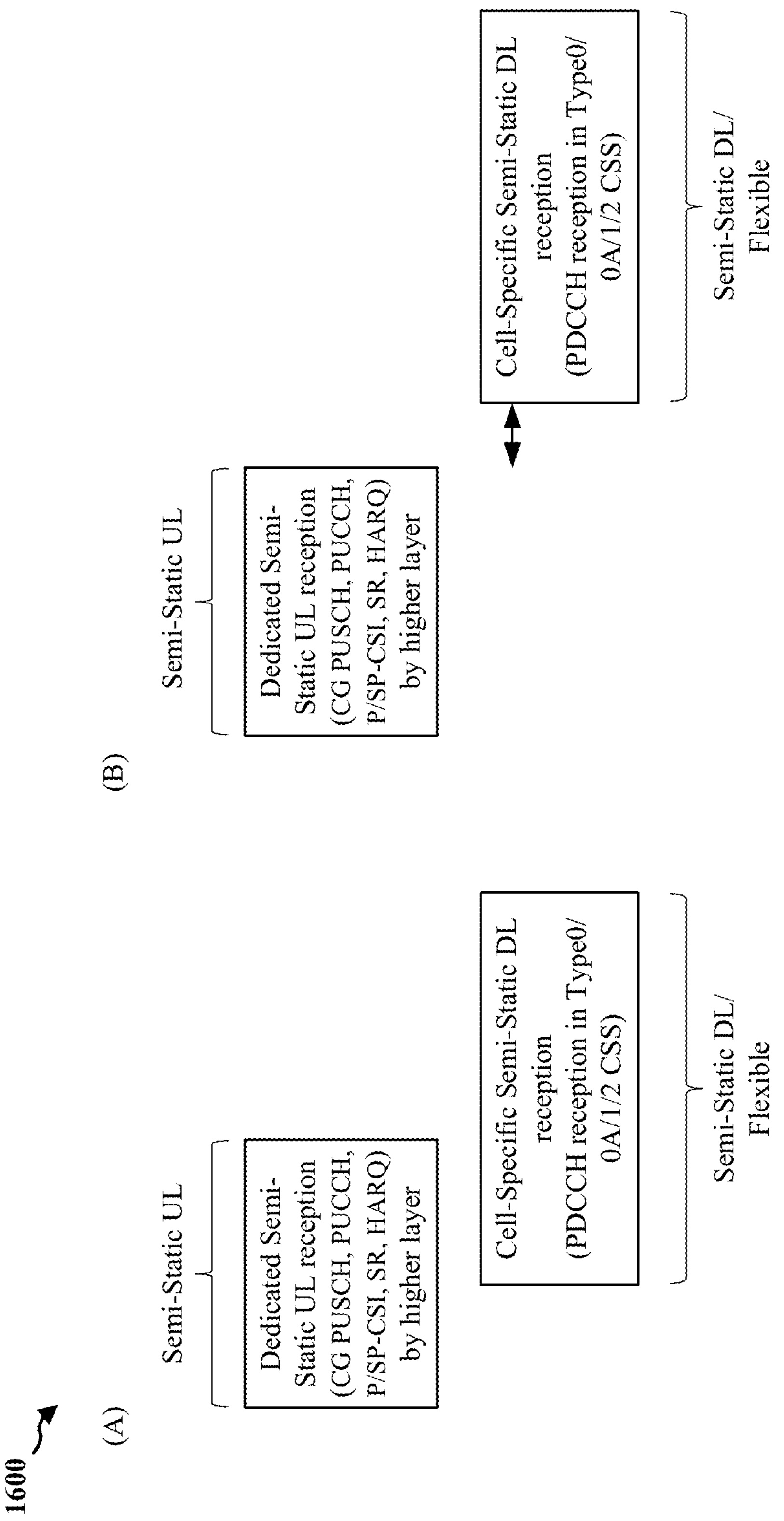
FIG. 16 is a diagram illustrating the priority rule related to a dedicated semi-static UL transmission and a cell-specific semi-static DL reception.

FIG. 16 is a diagram illustrating the priority rule related to a dedicated semi-static UL transmission and a cell-specific semi-static DL reception. Specifically, in the priority rule 1600, when a dedicated semi-static UL transmission collides with a cell-specific semi-static DL reception (e.g., PDCCH in Type0/0A/1/2 on CSS on any symbol), as shown in FIG. 16(A), or if Tx-Rx or Rx-Tx turn around time between the UL/DL transmission cannot be met, as shown in FIG. 16(B), the UE may prioritize the cell-specific semi-static DL reception (e.g., PDCCH) and cancel the dedicated semi-static UL transmission. In one embodiment, however, an exception may be applied when the dedicated semi-static UL transmission is assigned with a higher priority than the cell-specific semi-static DL reception. In this case, the UE may prioritize the dedicated semi-static UL transmission with the higher priority over the cell-specific semi-static DL reception.

Figure 17:
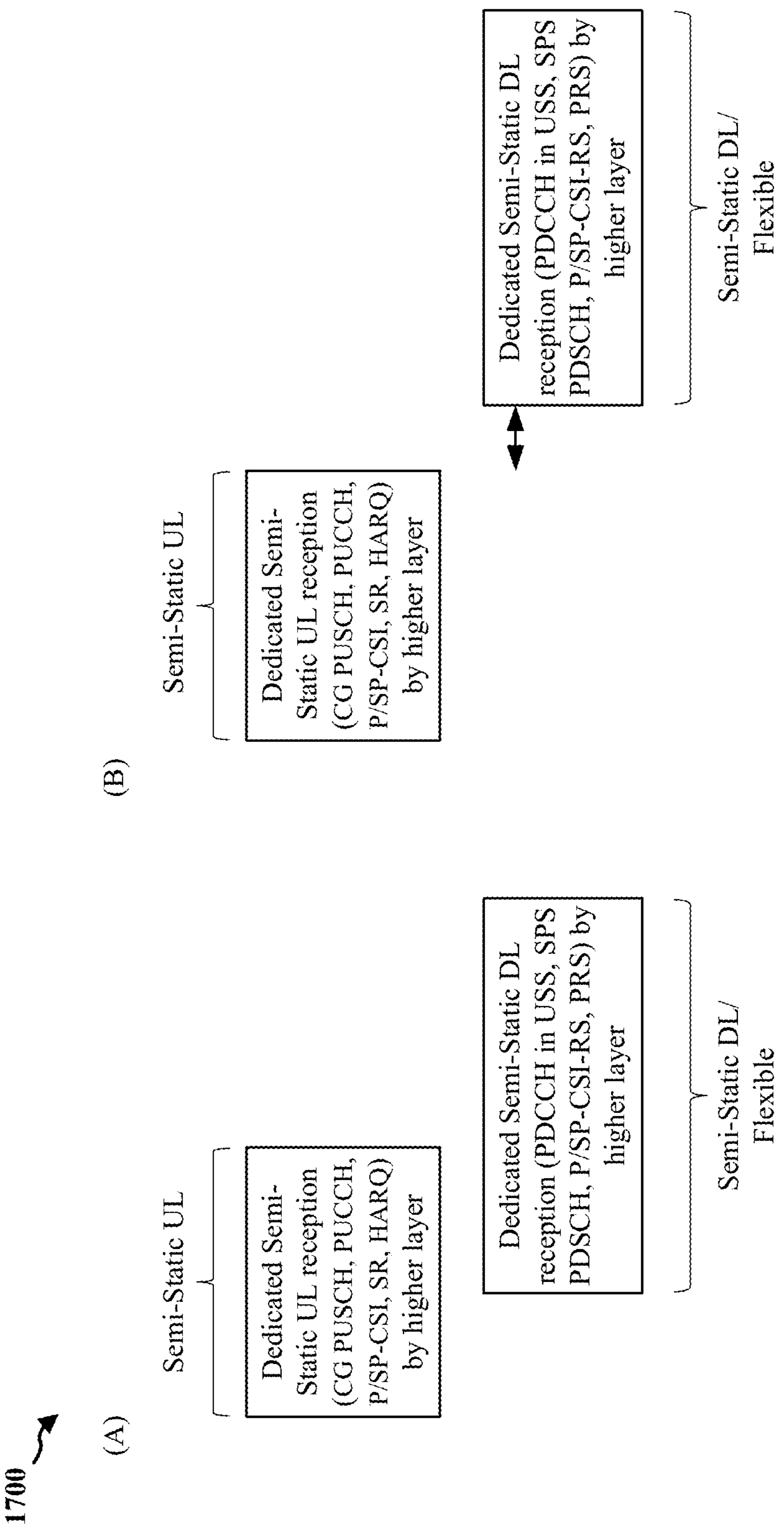
FIG. 17 is a diagram illustrating the priority rule related to a dedicated semi-static UL transmission and a dedicated semi-static DL reception.

FIG. 17 is a diagram illustrating the priority rule related to a dedicated semi-static UL transmission and a dedicated semi-static DL reception. Specifically, in the priority rule 1700, when a dedicated semi-static UL transmission collides with a dedicated semi-static DL reception on any symbol, as shown in FIG. 17(A), or if Tx-Rx or Rx-Tx turn around time cannot be met between the dedicated UL/DL transmissions, as shown in FIG. 17(B), the UE may determine the prioritization based on the priority of the dedicated semi-static UL/DL transmissions. For example, one of the dedicated semi-static UL transmission and the dedicated semi-static DL reception may be assigned with a high priority, and the other has a low priority. In this case, the UE may prioritize the dedicated semi-static UL transmission/DL reception with the higher priority. On the other hand, if both the dedicated semi-static UL transmission/DL reception are assigned with the same priorities, the UE may determine that an error case has occurred.

In certain configurations, dedicated semi-static TDD configurations through RRC signaling are less flexible then the dynamic TDD configuration allowed by SFI, and only the flexible indication through SFI table can deprioritize semi-static transmission and reception, while the flexible symbols in the dedicated TDD configuration cannot do so. Therefore, monitoring dynamic SFI signaling through group common DCI_2_0 is an essential feature. In certain scenarios when the SFI configuration does not change, it would be more efficient to signal the TDD format through semi-static RRC configuration. Thus, the UE may support semi-static RRC configuration of TDD format through slot format combinations based on a standardized SFI table. In one embodiment, the configuration is introduced in addition to the existing RRC IE TDD-UL-DL-ConfigDedicated, and must not collide with TDD-UL-DL-ConfigDedicated if it is provided. In one embodiment, the relevant rows of the standardized SFI table are enumerated as a value range. In one embodiment, the semi-static configuration can be overridden by dynamic SFI signaling. In one embodiment, transmission or reception over symbols indicated as being flexible using the proposed method is only carried out by the UE if the transmission or reception was scheduled by DCI.

Figure 18:
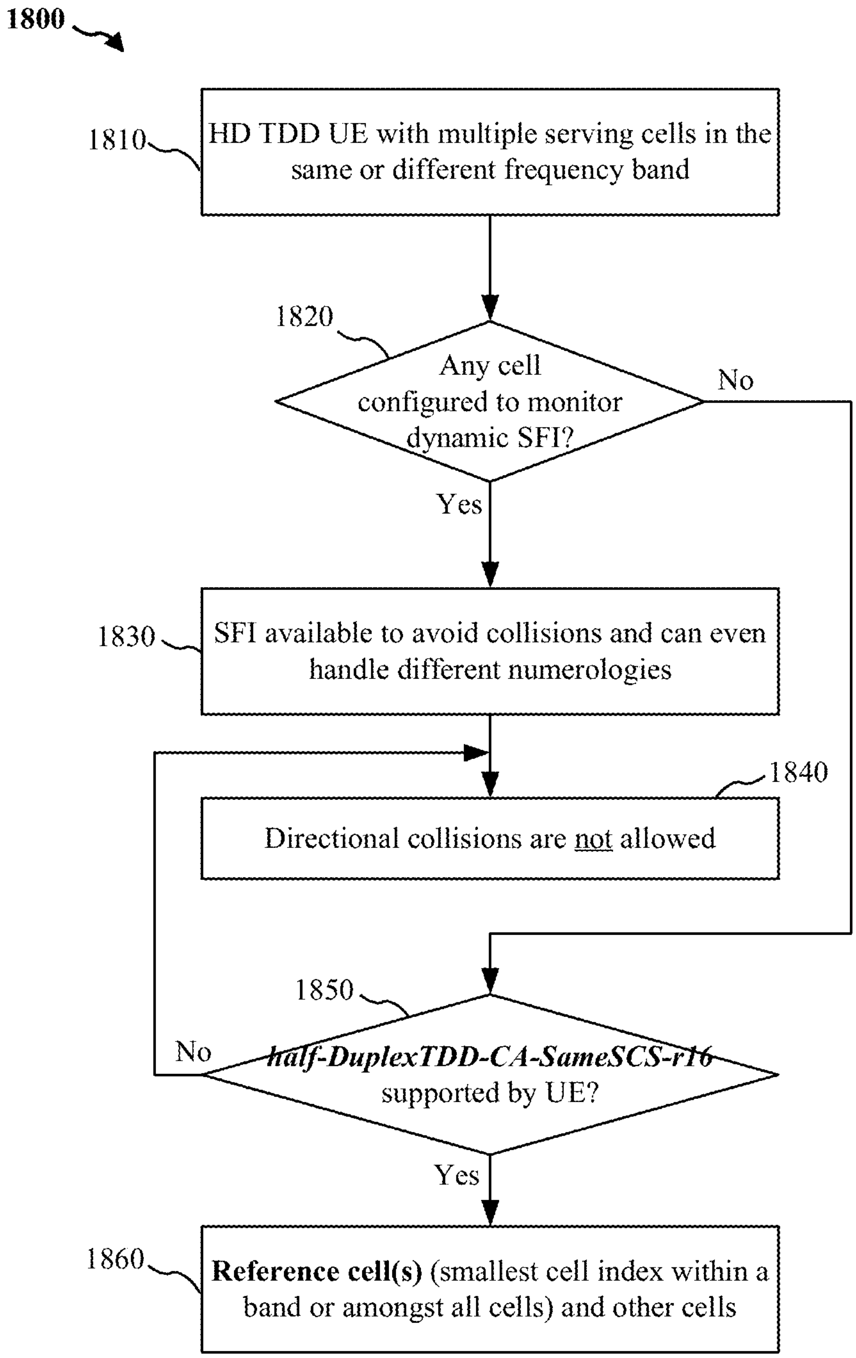
FIGS. 18-20 are flow charts showing the method (process) of determining when to apply TDD carrier aggregation directional collision/prioritization procedures in a half-duplex UE.
Figure 19:
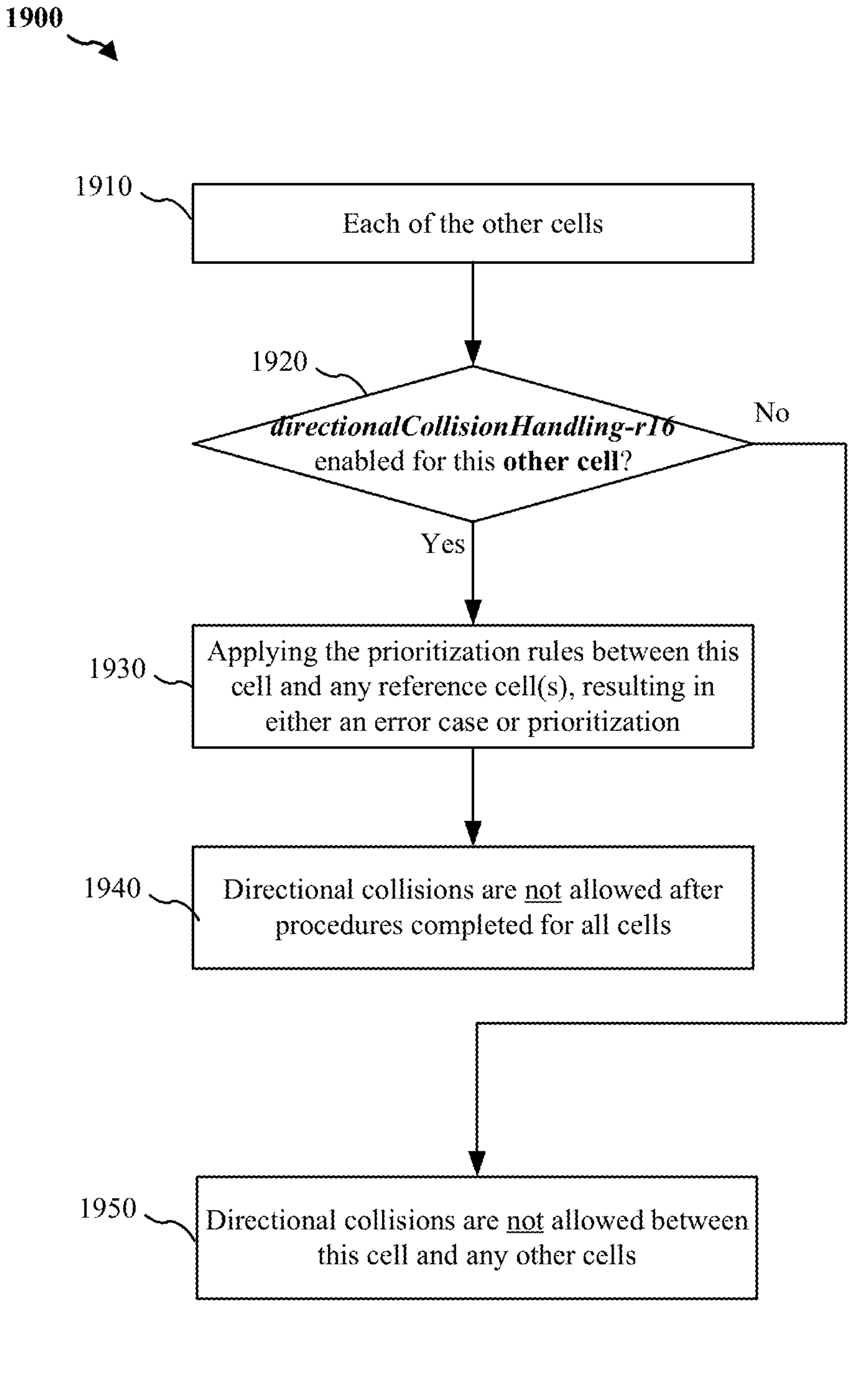
Figure 20:
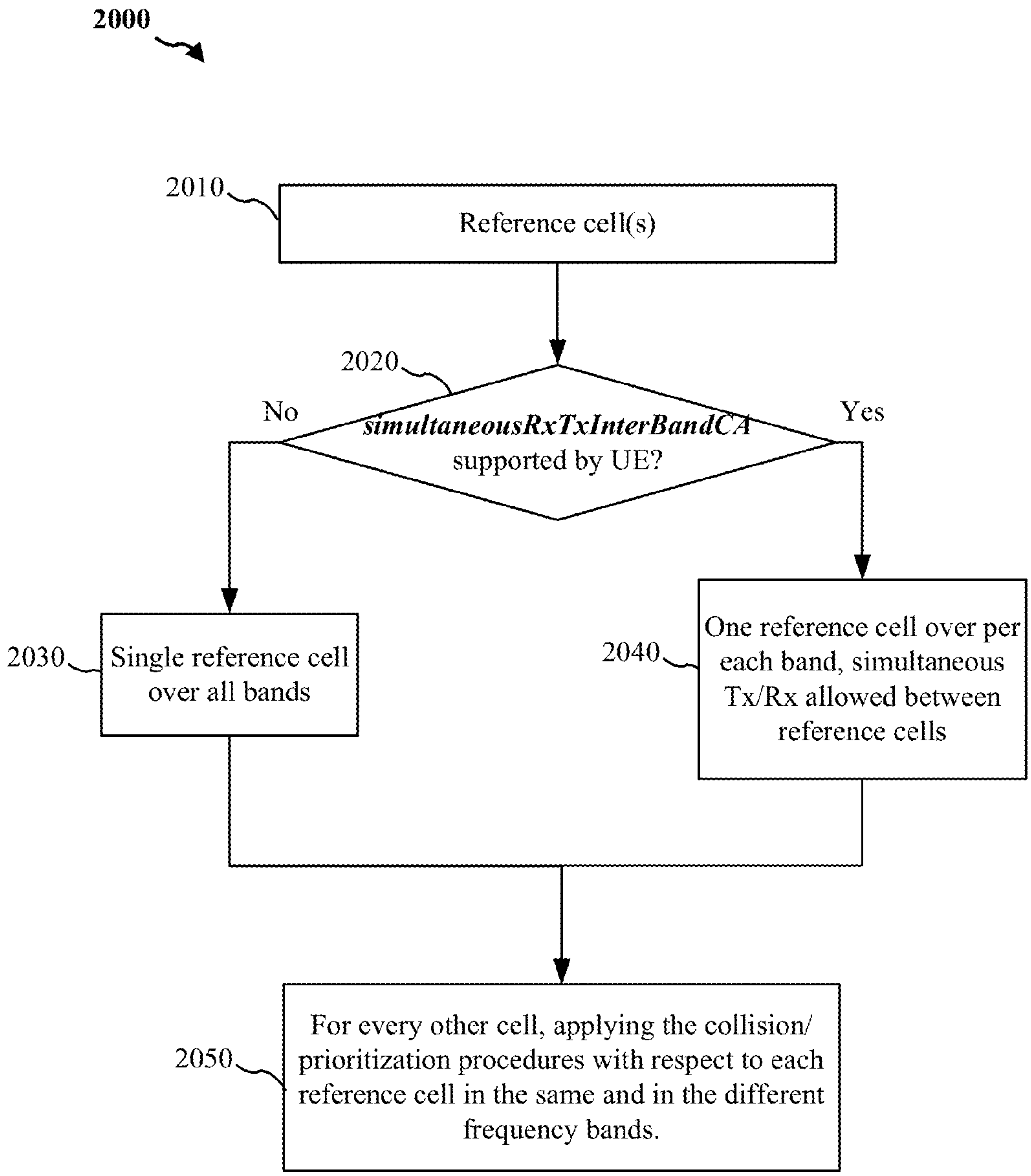

FIGS. 18-20 are flow charts showing the method (process) of determining when to apply TDD carrier aggregation directional collision/prioritization procedures in a half-duplex UE. The methods 1800, 1900 and 2000 may be performed by a half-duplex UE (e.g., UE 710). At operation 1810, a HD TDD UE is provided with multiple serving cells in the same or different frequency bands. At operation 1820, the UE determines whether there is any cell configured to monitor dynamic SFI. If the UE determines that there is one or more cells configured to monitor dynamic SFI, at operation 1830, the UE determines that SFI is available to avoid collisions, and may even handle different numerologies. Thus, at operation 1840, the UE determines that directional collisions are not allowed. On the other hand, if the UE determines that none of the cells is configured to monitor dynamic SFI, at operation 1850, the UE determines whether half-DuplexTDD-CA-SameSCS-r16 is supported. If half-DuplexTDD-CA-SameSCS-r16 is not supported, the UE returns to operation 1840 to determine that directional collisions are not allowed. On the other hand, if half-DuplexTDD-CA-SameSCS-r16 is supported, at operation 1860, the UE determines that there is one or more reference cells (i.e., the cells with the smallest cell index within a band or amongst all cells) and other cells.

At operation 1910, each of the other cells is performed with respective subsequent procedures. At operation 1920, for a specific one of the other cells, the UE determines whether directionalCollisionHandling-r16 is enabled for this other cell. If directionalCollisionHandling-r16 is enabled, at operation 1930, the UE applies the prioritization rules between this cell and any reference cell(s), resulting in either an error case or prioritization. Details of examples of the prioritization rules may be referred to in FIGS. 10-17. For example, the SSB reception may usually be prioritized by any cell, including the reference cell(s) and other cells. For other semi-static configurations, the prioritization rules apply for directional conflicts, and the reference cell(s) may have priority over other cells. For dynamic configurations (e.g., Tx/Rx scheduled by DCI), the prioritization rules apply for directional conflicts, and the reference cell(s) may have priority over other cells, with certain exceptions apply. At operation 1940, the UE may determine that directional collisions are not allowed after the procedures are completed for all cells. On the other hand, if directionalCollisionHandling-r16 is not enabled, at operation 1950, the UE may determine that directional collisions are not allowed between this cell and any other cells.

At operation 2010, the reference cell(s) are performed with respective subsequent procedures. At operation 2020, the UE determines whether simultaneousRxTxInterBandCA is supported. If simultaneousRxTxInterBandCA is not supported, at operation 2030, the UE determines that there is a single reference cell over all bands. On the other hand, if simultaneousRxTxInterBandCA is supported, at operation 2040, the UE determines that there are multiple reference cells, including one reference cell over per each band, and simultaneous Tx/Rx are allowed between the reference cells in different frequency bands. At operation 2050, the UE may determine that, for every other cell, the collision/prioritization procedures are applied with respect to each reference cell in the same and in the different frequency bands.

As shown in the method in FIGS. 18-20, simultaneous transmission and reception is allowed on the two reference cells on different frequency bands if the UE supports simultaneousRxTxInterBandCA. If other cells have a Tx/Rx colliding with the transmission on a reference cell, the UE prioritizes the transmission on the reference cell and the transmission on the other cells will be deprioritized. On the other hand, collision is not allowed between two cells when one of the two cells is not a reference cell (i.e., the cell cannot transmit Tx/Rx simultaneously), or one of the two cells is monitored by dynamic SFI, as the dynamic SFI may handle different numerologies. Further, collision is not allowed between two cells when half-DuplexTDD-CA-SameSCS-r16 not supported or when the two cells are on different numerologies. Moreover, any collision between two non-reference cells or between a non-reference cell and the reference cell within the same frequency band is not allowed. In certain configurations, when the UE supports directionalCollisionHandling-r16 and does not support simultaneousRxTxInterBandCA, collision between two cells may be mitigated by introducing the prioritization rules when the two colliding cells are in different bands, and the reference cell is prioritized.

Figure 21:
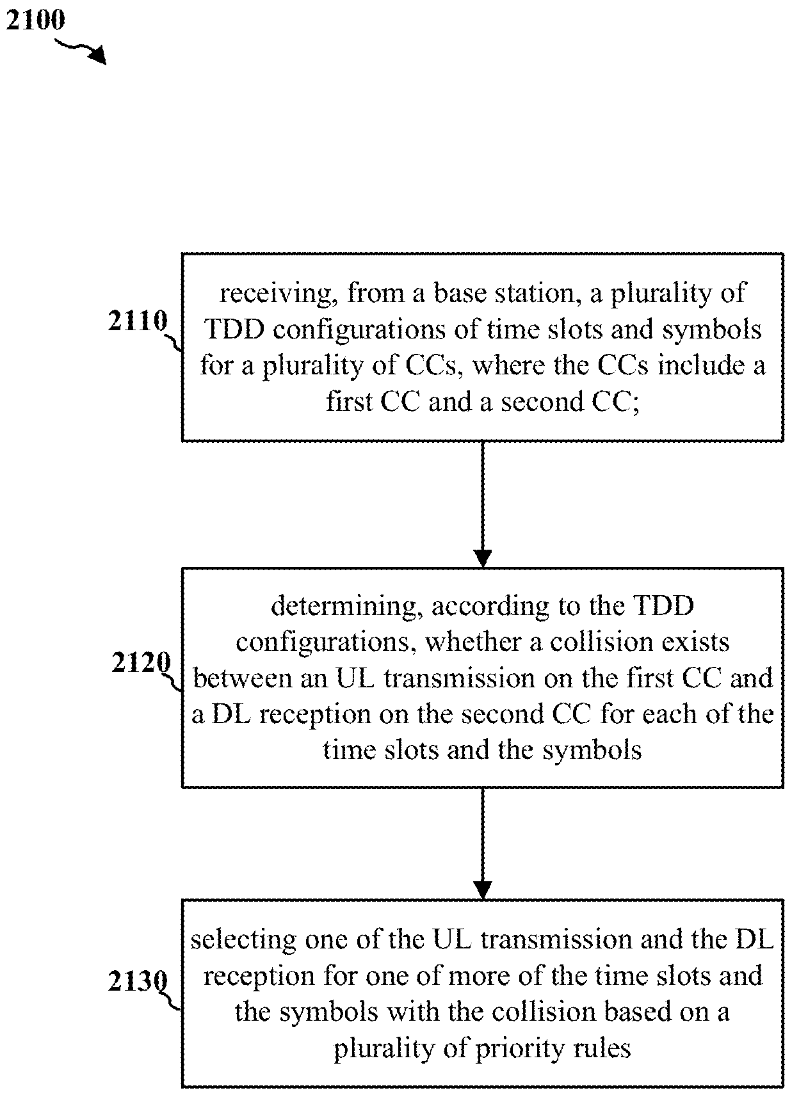
FIG. 21 is a flow chart of a method (process) for wireless communication of a UE.

FIG. 21 is a flow chart of a method (process) for wireless communication of a UE. The method may be performed by a UE (e.g., the UE 710). At operation 2110, the UE receives, from a base station, a plurality of TDD configurations of time slots and symbols for a plurality of component carriers CCs, including a first CC and a second CC. At operation 2120, the UE determines, according to the TDD configurations, whether a collision exists between an UL transmission on the first CC and a DL reception on the second CC for each of the time slots and the symbols. At operation 2130, the UE selects one of the UL transmission and the DL reception for one of more of the time slots and the symbols with the collision based on a plurality of priority rules.

In certain embodiments, the UE further indicates support of half-duplex operation in TDD carrier aggregation with same SCS, where numerologies are same over the first CC and the second CC.

In certain embodiments, the UE further enables directional collision handling for a plurality of serving cells, including the first CC and the second CC.

In certain embodiments, the UE is configured to receive the TDD configurations by: receiving, from the base station, a system information block (SIB) including a common TDD configuration for the CCs; receiving, from the base station, a dedicated TDD configuration for at least one of the first CC and the second CC by Radio Resource Control (RRC) signaling; or receiving, from the base station, a Downlink Control Information (DCI) TDD configuration for at least one of the first CC and the second CC by dynamic SFI signaling.

In certain embodiments, each of the TDD configurations is a dedicated TDD configuration, a cell-specific TDD configuration, or a dynamic TDD configuration indicated by a SFI table.

In certain embodiments, the collision is determined to exist between the UL transmission and the DL reception when: a time overlap exists between the UL transmission and the DL reception; or a requirement of a transmission-reception or reception-transmission turn around time between the UL transmission and the DL reception is not met.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

receiving, from a base station, a plurality of time division duplexing (TDD) configurations of time slots and symbols for a plurality of component carriers (CCs), wherein the CCs include a first CC and a second CC;

determining, according to the TDD configurations, one or more time slots or symbols for which a collision exists between an uplink (UL) transmission on the first CC and a downlink (DL) reception on the second CC, wherein determining the one or more time slots or symbols comprises, for each of the time slots and the symbols, determining whether a requirement of a transmission-reception or reception-transmission turn around time between the UL transmission and the DL reception is met; and selecting one of the UL transmission and the DL reception for at least one of the one or more time slots or symbols for which the collision exists based on a plurality of priority rules.

2. The method of claim 1, further comprising:

indicating support of half-duplex operation in TDD carrier aggregation with same subcarrier spacing (SCS), wherein numerologies are same over the first CC and the second CC.

3. The method of claim 1, further comprising:

enabling directional collision handling for a plurality of serving cells, including the first CC and the second CC.

4. The method of claim 1, wherein the UE is configured to receive the TDD configurations by:

receiving, from the base station, a system information block (SIB) including a common TDD configuration for the CCs;

receiving, from the base station, a dedicated TDD configuration for at least one of the first CC and the second CC by Radio Resource Control (RRC) signaling; or receiving, from the base station, a Downlink Control Information (DCI) TDD configuration for at least one of the first CC and the second CC by dynamic slot-format indicator (SFI) signaling.

5. The method of claim 1, wherein each of the TDD configurations is a dedicated TDD configuration, a cell-specific TDD configuration, or a dynamic TDD configuration indicated by a slot-format indicator (SFI) table.

6. The method of claim 1, wherein the prioritization rules include:

in response to the UL transmission being a cell-specific semi-static UL transmission and the DL reception being a dynamic DL reception, prioritizing one of the UL transmission and the DL reception according to a UE implementation rule.

7. The method of claim 6, further comprising:

in response to the dynamic DL reception being a PDSCH reception with repetitions and the UE implementation rule indicating prioritizing the UL transmission, allowing non-overlapping PDSCH repetitions in other ones of the time slots.

8. The method of claim 1, wherein the prioritization rules include:

in response to the UL transmission being a dynamic UL transmission and the DL reception being a cell-specific semi-static DL reception, prioritizing the dynamic UL transmission.

9. The method of claim 1, wherein the prioritization rules include:

in response to the UL transmission being a dynamic UL transmission and the DL reception being a dedicated semi-static DL reception, prioritizing the dynamic UL transmission; and in response to the UL transmission being a dedicated semi-static UL transmission and the DL reception being a dynamic DL reception, prioritizing the dynamic DL reception.

10. The method of claim 1, wherein the prioritization rules include:

in response to the UL transmission being a dynamic UL transmission and the DL reception being a dynamic DL reception, and one of the dynamic UL transmission and the dynamic DL reception has a higher priority than the other thereof, prioritizing the one of the dynamic UL transmission and the dynamic DL reception having the higher priority.

11. The method of claim 1, wherein the prioritization rules include:

in response to the UL transmission being a cell-specific semi-static UL transmission and the DL reception being a dedicated or cell-specific semi-static DL reception, prioritizing one of the UL transmission and the DL reception according to a UE implementation rule.

12. The method of claim 1, wherein the prioritization rules include:

in response to the UL transmission being a dedicated semi-static UL transmission and the DL reception being a cell-specific semi-static DL reception, in response to the dedicated semi-static UL transmission not having a higher priority than the cell-specific semi-static DL reception, prioritizing the cell-specific semi-static DL reception and canceling the dedicated semi-static UL transmission; and in response to the dedicated semi-static UL transmission having a higher priority than the cell-specific semi-static DL reception, prioritizing the dedicated semi-static UL transmission having the higher priority.

13. The method of claim 1, wherein the prioritization rules include:

in response to the UL transmission being a dedicated semi-static UL transmission and the DL reception being a dedicated semi-static DL reception, and one of the dedicated semi-static UL transmission and the dedicated semi-static DL reception has a higher priority than the other thereof, prioritizing the one of the dedicated semi-static UL transmission and the dedicated semi- static DL reception having the higher priority.

14. An apparatus for wireless communication, the apparatus being a user equipment (UE), comprising:

a memory; and at least one processor coupled to the memory and configured to:

receive, from a base station, a plurality of time division duplexing (TDD) configurations of time slots and symbols for a plurality of component carriers (CCs), wherein the CCs include a first CC and a second CC;

determine, according to the TDD configurations, one or more time slots or symbols for which a collision exists between an uplink (UL) transmission on the first CC and a downlink (DL) reception on the second CC, wherein, to determine the one or more time slots or symbols, the at least one processor is configured to, for each of the time slots and the symbols, determine whether a requirement of a transmission-reception or reception-transmission turn around time between the UL transmission and the DL reception is met; and select one of the UL transmission and the DL reception for at least one of the one or more time slots or symbols for which the collision exists based on a plurality of priority rules.

15. The apparatus of claim 14, wherein the at least one processor is further configured to:

indicate support of half-duplex operation in TDD carrier aggregation with same subcarrier spacing (SCS), wherein numerologies are same over the first CC and the second CC.

16. The apparatus of claim 14, wherein the at least one processor is further configured to:

enable directional collision handling for a plurality of serving cells, including the first CC and the second CC.

17. The apparatus of claim 14, wherein the at least one processor is configured to receive the TDD configurations by:

receiving, from the base station, a system information block (SIB) including a common TDD configuration for the CCs;

receiving, from the base station, a dedicated TDD configuration for at least one of the first CC and the second CC by Radio Resource Control (RRC) signaling; or receiving, from the base station, a Downlink Control Information (DCI) TDD configuration for at least one of the first CC and the second CC by dynamic slot-format indicator (SFI) signaling.

18. The apparatus of claim 14, wherein each of the TDD configurations is a dedicated TDD configuration, a cell-specific TDD configuration, or a dynamic TDD configuration indicated by a slot-format indicator (SFI) table.

* * * * *